(12) United States Patent
Yamasaki et al.

(10) Patent No.: US 8,943,915 B2
(45) Date of Patent: Feb. 3, 2015

(54) ATTACHMENT STRUCTURE FOR OUTPUT SPROCKET WHEEL

(75) Inventors: Takuya Yamasaki, Wako (JP); Shinya Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 13/410,808

(22) Filed: Mar. 2, 2012

(65) Prior Publication Data

US 2012/0240697 A1 Sep. 27, 2012

(30) Foreign Application Priority Data

Mar. 24, 2011 (JP) ................................. 2011-066243

(51) Int. Cl.
*F16H 3/02* (2006.01)
*F16D 1/06* (2006.01)
*F16D 1/108* (2006.01)
*F16D 1/10* (2006.01)

(52) U.S. Cl.
CPC ...... *F16D 1/06* (2013.01); *F16D 1/108* (2013.01); *F16D 2001/103* (2013.01)
USPC .......................................................... 74/25

(58) Field of Classification Search
USPC ........... 74/325, 329, 335, 339, 337.5, 473.25, 74/473.24, 473.36
See application file for complete search history.

(56) References Cited

U.S. PATENT DOCUMENTS

| 4,702,120 | A * | 10/1987 | Okada et al. ..................... 74/371 |
| 4,779,475 | A * | 10/1988 | Irikura et al. ................... 74/371 |
| 5,992,254 | A * | 11/1999 | Machado ......................... 74/335 |
| 7,578,213 | B2 * | 8/2009 | Arakawa et al. ................ 74/329 |
| 7,717,007 | B2 * | 5/2010 | Hiroi et al. ..................... 74/335 |
| 8,327,729 | B2 * | 12/2012 | Matsumoto et al. ............ 74/325 |
| 8,561,492 | B2 * | 10/2013 | Matsumoto ..................... 74/325 |
| 2006/0191363 | A1 * | 8/2006 | Thiessen et al. ................ 74/325 |
| 2008/0098843 | A1 * | 5/2008 | Hemphill et al. .......... 74/473.11 |

FOREIGN PATENT DOCUMENTS

JP 05-085460 4/1993

* cited by examiner

*Primary Examiner* — Ha D Ho
*Assistant Examiner* — Jude Agendia
(74) *Attorney, Agent, or Firm* — Rankin, Hill & Clark LLP

(57) ABSTRACT

An output sprocket wheel attachment structure includes a coned disk spring fitted with an output power shaft is abutted with and positioned by a stepped portion. An output sprocket wheel spline-fitted with spline grooves formed at an outer side portion of the output power shaft with respect to the stepped portion is pressed by the coned disk spring. A cap nut which engages with male threads formed at an end portion of the output power shaft is restricted and fixed at a bottom face thereof by and to an axial end of the output power shaft. Movement in an axial direction of the output sprocket wheel pressed by the coned disk spring is restricted by an opening end portion of the cap nut.

14 Claims, 19 Drawing Sheets

ATTACHMENT STRUCTURE FOR OUTPUT SPROCKET WHEEL

BACKGROUND OF THE INVENTION

1. Field of the Invention

This invention relates to an attachment structure for an output sprocket wheel attached to an output power shaft of a power unit internal combustion engine.

2. Description of Related Art

An example wherein a speed change gear is incorporated in an engine case of an internal combustion engine and a countershaft (driven gear wheel shaft) of the speed change gear is used as an output power shaft which has an output sprocket wheel attached to an end portion thereof (refer to, for example, Japanese Patent Laid-Open No. Hei 5-085460).

In the multistage speed change gear disclosed in Japanese Patent Laid-Open No. Hei 5-085460, an end portion of a countershaft (driven gear wheel shaft) has involute spline engagement teeth formed at a reduced diameter portion thereof which is reduced in diameter and is formed with a stepped portion. An output sprocket wheel is spline-fitted with the stepped portion in such a manner as to sandwich a collar member therebetween, and a bolt tightened to an end face of the countershaft with a washer interposed therebetween.

In particular, the output sprocket wheel attachment structure disclosed in Japanese Patent Laid-Open No. Hei 5-085460 is structured such that the output sprocket wheel is positioned and fixed by the collar member between the stepped portion and the washer.

Accordingly, the output sprocket wheel cannot move in an axial direction at all and cannot absorb a force component which is caused by wrapping of a chain and waves in the axial direction. Therefore, the output sprocket wheel cannot transmit power stably.

SUMMARY OF THE INVENTION

The present invention has been made in view of such a point as described above, and it is an object of the present invention to provide an output sprocket wheel attachment structure for a multistage speed change gear wherein an output sprocket wheel is normally positioned within a required range in an axial direction while a force component which waves in the axial direction is absorbed so that stable power transmission can be achieved.

In order to attain the object described above, and in accordance with the present invention, an attachment structure for an output sprocket wheel for transmitting driving of an output power shaft of an internal combustion engine to a chain, includes a coned disk spring, the output sprocket wheel, and a cap nut. The coned disk spring is fitted with the output power shaft and is abutted with and positioned by a stepped portion. The output sprocket wheel is spline-fitted with spline grooves formed at an outer side portion of the output power shaft with respect to the stepped portion and is pressed by the coned disk spring. The cap nut, which engages with male threads formed at an end portion of the output power shaft, is restricted and fixed at a bottom face thereof by and to an axial end of the output power shaft. Movement in an axial direction of the output sprocket wheel pressed by the coned disk spring is restricted by an opening end portion of the cap nut. Therefore, a small number of parts are used to permit movement of the output sprocket wheel in the axial direction without directly tightening and fixing the output sprocket wheel. Further, while a force component which is applied to the output sprocket wheel and is deflected in the axial direction is absorbed by the coned disk spring, stabilized power transmission can be carried out with the output sprocket wheel always positioned in a required axial range.

In further accordance with the present invention, an annular spacer is inserted between the opening end portion of the cap nut and the output sprocket wheel. Accordingly, the annular spacer is inserted between the opening end portion of the cap nut and the output sprocket wheel. Therefore, such a situation that the output sprocket wheel is abutted directly with the opening end portion of the cap nut to loosen the screwed engagement of the cap nut can be prevented.

In further accordance with the present invention, the attachment structure for the output sprocket wheel includes the spacer, which is formed by applying DLC working. Therefore, the friction force by the abutment of the output sprocket wheel with the spacer is reduced significantly. Consequently, an influence of rotation of the output sprocket wheel upon the screwed engagement of the cap nut can be prevented, and rotation of the output sprocket wheel can be smoothened.

In further accordance with the present invention, an interposition member is interposed between the axial end of the output power shaft and a bottom face of the cap nut. Therefore, it is easy to work the axial end of the output power shaft (12), and the cap nut (37) of a special type is not required but a general purpose article can be used.

In accordance with another aspect of the invention, an attachment structure for an output sprocket wheel for transmitting driving of an output power shaft of an internal combustion engine to a chain includes a coned disk spring, a torque detecting cylindrical member, the output sprocket wheel, and a cap nut. The coned disk spring is fitted with the output power shaft and is abutted with and positioned by a stepped portion. The torque detecting cylindrical member is spline-fitted with spline grooves formed at an axial outside portion of the output power shaft with respect to the stepped portion. The output sprocket wheel extends, at an inner circumferential end of an inner circumferential base portion thereof which supports sprocket teeth, to the outer side in an axial direction to configure a cylindrical base portion. The cylindrical base portion of the output sprocket wheel covers an outer circumference of the torque detecting cylindrical member. An axial outer side end portion of the cylindrical base portion is fixed to an end portion of a torsion detecting cylindrical portion, which extends to the outer side in the axial direction from a spline fitting portion of the torque detecting cylindrical member. An axial inner side end portion of the cylindrical base portion is pressed by the coned disk spring. The cap nut, which engages with male threads formed at an end portion of the output power shaft, is restricted and fixed at a bottom face thereof by and to an axial end of the output power shaft. Movement in the axial direction of the output sprocket wheel pressed by the coned disk spring is restricted by an opening end portion of the cap nut. Therefore, the movement of the output sprocket wheel in the axial direction is permitted without directly tightening and fixing the output sprocket wheel together with the torque detecting cylindrical member. Further, while a force component which is applied to the output sprocket wheel and is deflected in the axial direction is absorbed by the coned disk spring, stabilized power transmission can be carried out with the output sprocket wheel always positioned in a required axial range.

Since the torque detecting cylindrical member is extended to the outer side in the axial direction from the spline fitting portion, which is spline-fitted with the output power shaft, to form the torsion detecting cylindrical portion and the end portion of the same is fixed to the end portion of the cylindrical base portion of the output sprocket wheel, torque can be measured readily by detecting torsion of the torsion detecting cylindrical portion.

In further accordance with the present invention, the attachment structure for the output sprocket wheel includes a plurality of driving speed change gear wheels and a plurality of driven speed change gear wheels that are supported for rotation on gear wheel shafts, which extend in parallel to each other, in a normally meshing state for individual shift stages. Plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided. The gear wheel shaft for the driven speed change gear wheels of a multistage speed change gear, wherein a control rod of a speed change driving mechanism moves in an axial direction in the inside of the gear wheel shaft to drive the engagement changing mechanism to carry out speed change is the output power shaft.

Therefore, on the end portion of the hollow output power shaft to which the output sprocket wheel cannot be fastened directly by means of a bolt, the output sprocket wheel can be supported for movement within a required range in the axial direction by a simple structure including a small number of parts. Thus, stabilized power transmission can be achieved.

DETAILED DESCRIPTION OF THE PREFERRED EMBODIMENTS

In the following, an embodiment according to the present invention is described with reference to FIGS. 1 to 15.

A multistage speed change gear 10 according to the present embodiment is incorporated in an internal combustion engine carried on a motorcycle.

Figure 1:
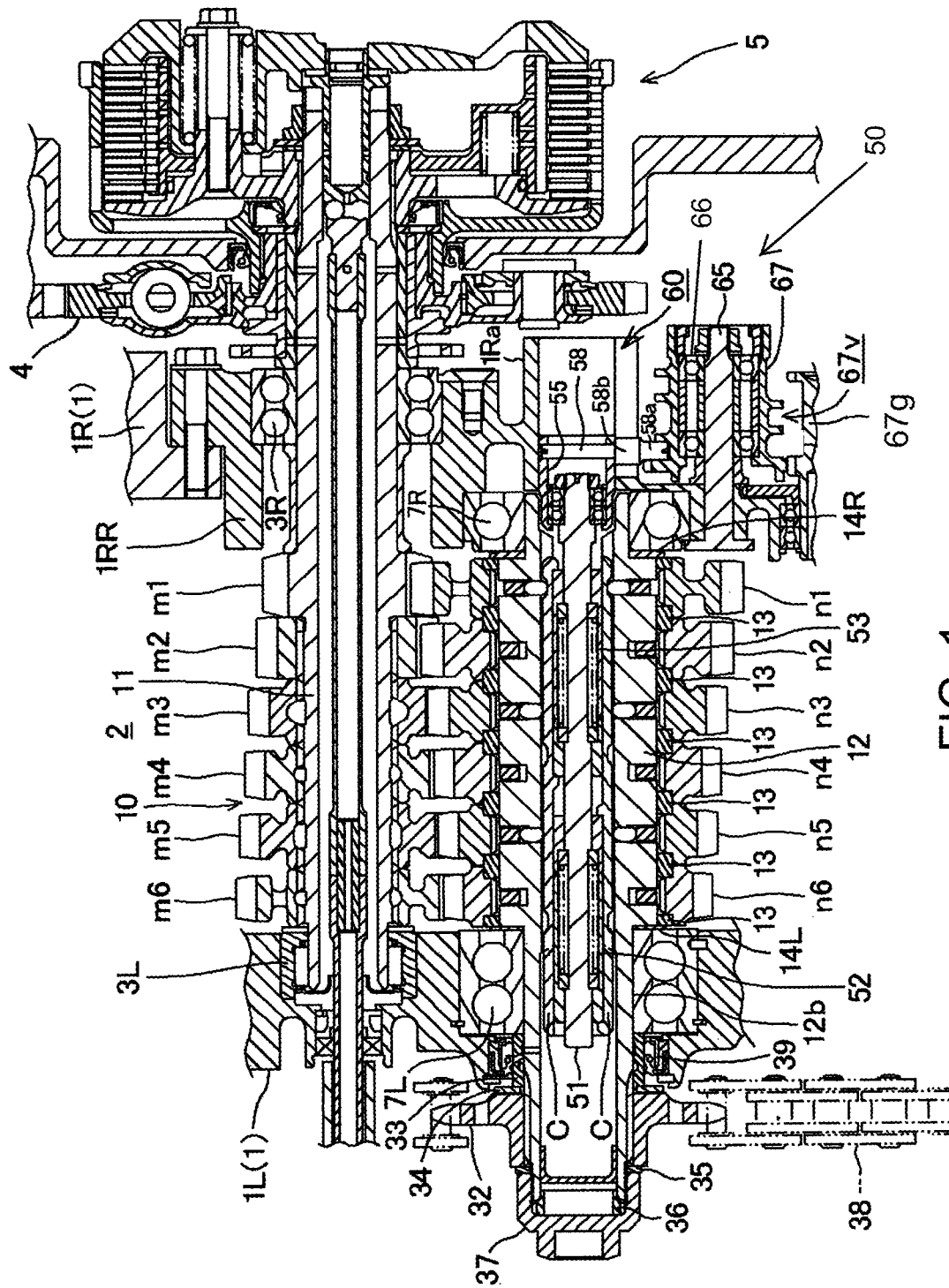
FIG. 1 is a sectional view of a multistage speed change gear according to an embodiment of the present invention.

FIG. 1 is a sectional view of the multistage speed change gear 10, and the multistage speed change gear 10 is provided in an engine case 1 common to an internal combustion engine as shown in FIG. 1.

The engine case 1 configured by combining a left engine case 1L and a right engine case 1R split leftwardly and rightwardly from each other forms a speed change chamber 2, and a main gear wheel shaft 11 and a counter gear wheel shaft 12 are supported for rotation in the speed change chamber 2 such that they are directed in parallel to each other in leftward and rightward directions.

The main gear wheel shaft 11 is supported for rotation on a side wall of the left engine case 1L and a side wall 1RR of a separate element of the right engine case 1R through bearings 3L and 3R, and a friction clutch 5 of the multiple disk type is provided at a right end portion of the main gear wheel shaft 11 which projects outwardly from the speed change chamber 2 through the right bearing 3R.

On the left side of the friction clutch 5, a primary driven gear wheel 4 to which rotation of a crankshaft (not shown) is transmitted is supported for rotation on the main gear wheel shaft 11.

Rotation of the crankshaft of the internal combustion engine is transmitted from the primary driven gear wheel 4 to the main gear wheel shaft 11 through the friction clutch 5 when it is in an engaged state.

On the other hand, also the counter gear wheel shaft 12 is supported for rotation on the side wall of the left engine case 1L and the side wall 1RR of the right engine case 1R through bearings 7L and 7R, and an output sprocket wheel 32 is attached by spline-fitting at a left end portion of the counter gear wheel shaft 12 which projects outwardly from the speed change chamber 2 through the left bearing 7L.

An attachment structure for the output sprocket wheel 32 is hereinafter described.

A driving chain 38 wrapped around the output sprocket wheel 32 is wrapped around another sprocket wheel which drives a rear wheel (not shown) located rearwardly such that rotating power of the counter gear wheel shaft 12 is transmitted to the rear wheel so that the vehicle travels.

A group of driving speed change gear wheels m is mounted for integral rotation with the main gear wheel shaft 11 between the left and right bearings 3L and 3R.

The first driving speed change gear wheel m1 is formed integrally with the main gear wheel shaft 11 along the right bearing 3R, and the second, third, fourth, fifth and sixth driving speed change gear wheels m2, m3, m4, m5 and m6 having diameters successively increasing from the right to the left are spline-fitted with a spline formed on the main gear wheel shaft 11 between the first driving speed change gear wheel m1 and the left bearing 3L.

On the other hand, on the counter gear wheel shaft 12, a group of driven speed change gear wheels n is supported for rotation between the left and right bearings 7L and 7R with ring-shaped bearing collar members 13 interposed therebetween.

On the counter gear wheel shaft 12, five bearing collar members 13 are outwardly fitted at equal distances between the bearing collar member 13 at the right end outwardly fitted on the counter gear wheel shaft 12 through a collar member 14R interposed leftwardly of the right bearing 7R and the bearing collar member 13 at the left end outwardly fitted on the counter gear wheel shaft 12 through a collar member 14L interposed rightwardly of the left bearing 7L. Further, the first, second, third, fourth, fifth and sixth driven speed change gear wheels n1, n2, n3, n4, n5 and n6 having diameters successively decreasing from the right to the left are supported for rotation on the counter gear wheel shaft 12 in such a manner as to extend across adjacent ones 13, 13 of the totaling seven bearing collar members 13.

The first, second, third, fourth, fifth and sixth driving speed change gear wheels m2, m3, m4, m5 and m6 which rotate integrally with the main gear wheel shaft 11 are normally held in meshing engagement with the corresponding first, second, third, fourth, fifth and sixth driven speed change gear wheels n1, n2, n3, n4, n5 and n6 supported for rotation on the counter gear wheel shaft 12, respectively.

The meshing engagement between the first driving speed change gear wheel m1 and the first driven speed change gear wheel n1 configures the first speed of the highest reduction ratio while the meshing engagement between the sixth driving speed change gear wheel m6 and the sixth driven speed change gear wheel n6 configures the sixth speed of the lowest reduction ratio, and between them, the speed reduction ratio successively decreases to configure the second, third, fourth and fifth speeds.

On the counter gear wheel shaft 12, odd-numbered stage gear wheels (first, third and fifth driven speed change gear wheels n1, n3 and n5) of odd-numbered shift stages and even-numbered stage gear wheels (second, fourth and sixth driven speed change gear wheels n2, n4 and n6) of even-numbered shift stages are arrayed alternately.

In the counter gear wheel shaft 12 having a hollow cylindrical shape, engaging device 20 engageable with the driven speed change gear wheels n is incorporated in such a manner as hereinafter described, and totaling eight cam rods C (Cao, Cao, Cae, Cae, Cbo, Cbo, Cbe and Cbe) of four kinds each of which is a component of the engaging device 20 and includes two cam rods C as hereinafter described are fitted in cam guide grooves 12g hereinafter described which are formed on an inner circumferential face of the hollow of the counter gear wheel shaft 12 such that the cam rods C are movable in an axial direction.

A control rod 51 which is a component of speed change driving device 50 for driving the cam rods C to carry out speed change is inserted along the center axis of the hollow of the counter gear wheel shaft 12. Movement of the control rod 51 in an axial direction moves the cam rods C in the axial direction in an interlocking relationship through lost motion mechanisms 52 and 53.

A mechanism for moving the control rod 51 in its axial direction is provided in the right engine case 1R.

The movement of the control rod 51 in an axial direction moves the cam rods C in an axial direction in an interlocking relationship through the lost motion mechanisms 52 and 53, and the movement of the cam rods C engages the driven speed change gear wheels n selectively with the counter gear wheel shaft 12 by the engaging device 20 incorporated in the counter gear wheel shaft 12 to carry out speed change.

Figure 6:
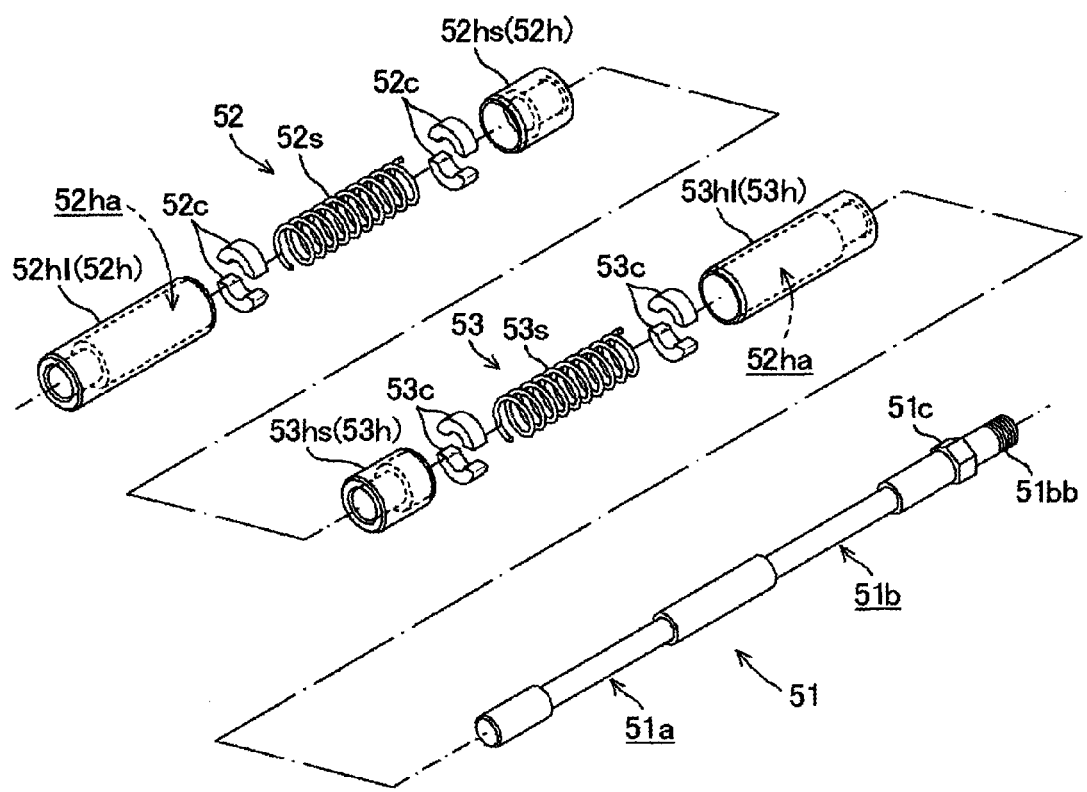
FIG. 6 is an exploded perspective view of a control rod and a lost motion mechanism.

Referring to FIG. 6, the control rod 51 of the speed change driving device 50 has a form of a cylindrical bar, and at two left and right places in the axial direction, outer circumferential recessed portions 51a and 51b having reduced diameters are formed over a predetermined length on the control rod 51.

A right end of the control rod 51 is a male threaded end portion 51bb on which male threads are formed, and a nut portion 51c of a hexagonal shape is formed forwardly of the male threaded end portion 51bb.

The lost motion mechanisms 52 and 53 are assembled corresponding to the left and right outer circumferential recessed portions 51a and 51b of the control rod 51, respectively.

The left and right lost motion mechanisms 52 and 53 have a same structure and are disposed on the left and right.

In the left side lost motion mechanism 52, a spring holder 52h in which the control rod 51 is inserted for sliding movement is configured from a connection of an long holder 52h1 and a short holder 52hs, and an inner circumferential recessed portion 52ha corresponding to the outer circumferential recessed portion 51a of the control rod 51 is formed on an inner circumferential face of the lost motion mechanism 52.

When the control rod 51 is inserted into and through the spring holder 52h and the spring holder 52h is positioned in the outer circumferential recessed portion 51a, two spaces of the inner circumferential recessed portion 52ha of the spring holder 52h and the outer circumferential recessed portion 51a of the control rod 51 configure a common space.

A pair of left and right cotters 52c, 52c which are spring receivers are fitted in an opposing relationship to each other such that they extend across the two spaces of the inner circumferential recessed portion 52ha of the spring holder 52h and the outer circumferential recessed portion 51a of the control rod 51. Further, a compression coil spring 52s wound around the control rod 51 is interposed between the cotters 52c, 52c and biases the cotters 52c, 52c in a direction in which they are spaced away from each other.

It is to be noted that each cotter 52c is in the form of a hollow disk having an outer diameter equal to the inner diameter of the inner circumferential recessed portion 52ha of the spring holder 52h and an inner diameter equal to the outer diameter of the outer circumferential recessed portion 51a of the control rod 51 and is formed from two half split members so that the cotter 52c is assembled.

Also the right side lost motion mechanism 53 (a spring holder 53h, a long holder 53h1, a short holder 53hs, an inner circumferential recessed portion 53ha, cotters 53c and a compression coil spring 53s) has a same structure and is disposed in the outer circumferential recessed portion 51b of the control rod 51.

Accordingly, if the control rod 51 moves in an axial direction, then the spring holders 52h and 53h are moved in the axial direction through the compression coil springs 52s and 53s of the left and right lost motion mechanisms 52 and 53.

Figure 7:
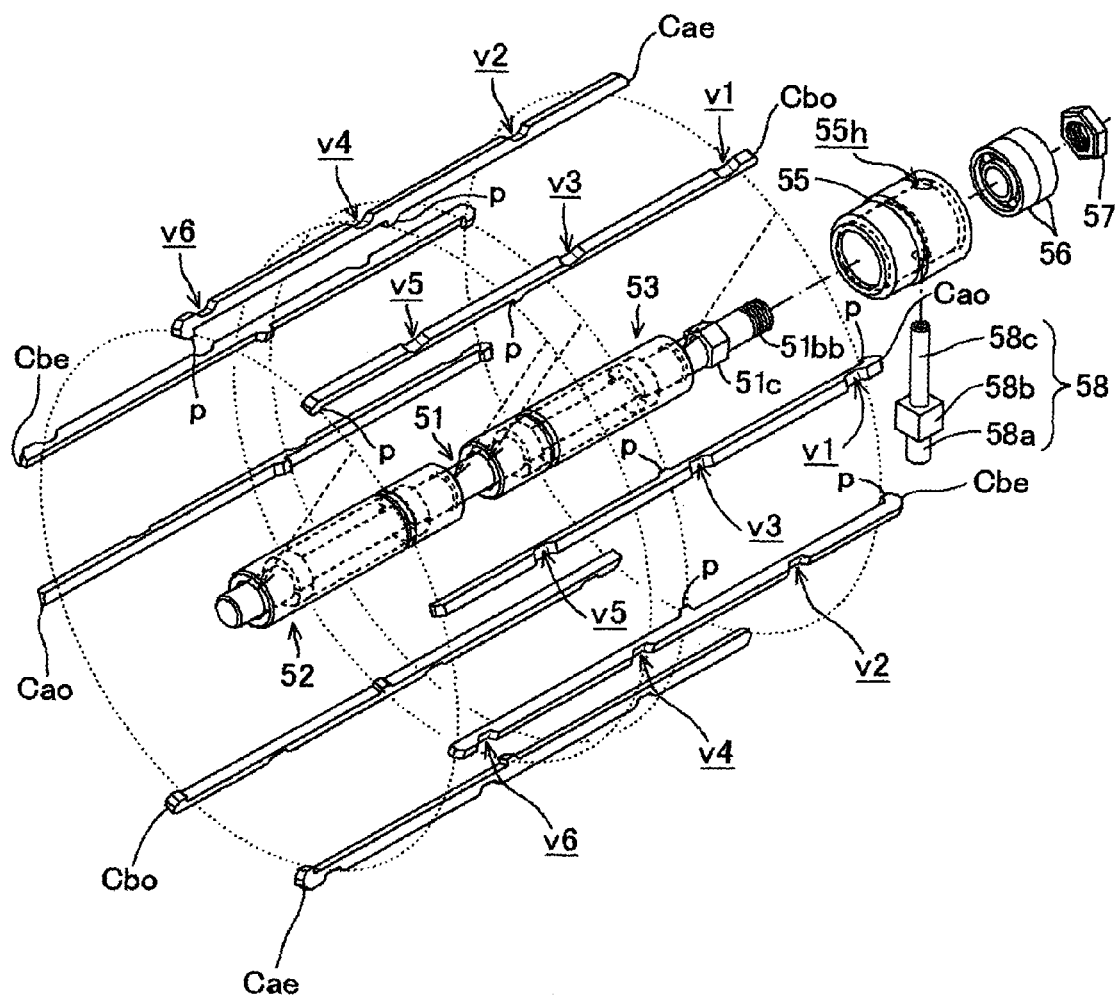
FIG. 7 is an exploded perspective view of a state in which the lost motion mechanism is assembled to the control rod and a cam rod and so forth.

With an outer circumferential face of the spring holders 52h and 53h of the lost motion mechanisms 52 and 53 attached to the left and right outer circumferential recessed portions 51a and 51b of the control rod 51, the eight cam rods C (Cao, Cao, Cae, Cae, Cbo, Cbo, Cbe and Cbe) are abutted at radial positions (refer to FIG. 7).

Each cam rod C is a prism-shaped bar-like member having a rectangular cross section and extending long in an axial direction, and an outer peripheral side face on the opposite side to an inner peripheral side face of the cam rod C which contacts with the spring holders 52h and 53h forms a cam face. Three cam grooves v are formed at required positions of the cam face. From the inner peripheral side face of the cam rod C, a pair of locking pawls p project in such a manner as to sandwich one of the spring holders 52h and 53h from the left and the right.

Since the cam rod C is a prism-shaped bar-like member having a rectangular cross section which does not have a special shape and having a generally simple outer shape, it can be fabricated readily.

As the odd-numbered stage cam rods Cao and Cbo which have cam grooves v1, v3 and v5 formed at three places thereof which correspond to the odd-numbered stage gear wheels (first, third and fifth driven speed change gear wheels n1, n3 and n5), two kinds for forward rotation (rotational direction in which, upon acceleration, force is applied from a driven speed change gear wheel n to the counter gear wheel shaft 12) and for reverse rotation (rotational direction in which, upon deceleration, force is applied from a driven speed change gear wheel n to the counter gear wheel shaft 12) are available. Each of the forward rotation odd-numbered stage cam rods Cao has, on the inner peripheral side face thereof, locking pawls p for locking the right side spring holder 53h, and each of the other reverse rotation odd-numbered stage cam rods Cbo has, on the inner peripheral side face thereof, locking pawls p for locking the left side spring holder 52h (refer to FIG. 7).

Similarly, as the even-numbered stage cam rods Cae and Cbe which have cam grooves v2, v4 and v6 formed at three places thereof which correspond to the even-numbered stage gear wheels (second, fourth and sixth driven speed change gear wheels n2, n4 and n6), two kinds for forward rotation and for reverse rotation are available, and each of the forward rotation even-numbered stage cam rods Cae has, on the inner peripheral side face thereof, locking pawls p for locking the left side spring holder 52h. Further, each of the other reverse rotation even-numbered stage cam rods Cbe has, on the inner peripheral side face, locking pawls p for locking the right side spring holder 53h (refer to FIG. 7).

Accordingly, by movement of the control rod 51 in an axial direction, the forward rotation odd-numbered stage cam rods Cao and the reverse rotation even-numbered stage cam rods Cbe are moved in an interlocking relationship in the axial direction together with the spring holder 53h through the compression coil spring 53s of the lost motion mechanism 53 on the right side while the reverse rotation odd-numbered stage cam rods Cbo and the forward rotation even-numbered stage cam rod Cae are moved in an interlocking relationship in the axial direction together with the spring holder 52h through the coil spring 52s of the lost motion mechanism 52 on the left side.

As shown in FIG. 7, at a right end portion of the control rod 51 on the right side with respect to the nut portion 51c, a control rod operating element 55 of a cylindrical shape is attached through a ball bearing 56 fitted in the inside of the same.

The ball bearing 56 is formed from two ball bearings connected to each other in the axial direction and is fitted with the right end portion of the control rod 51 on the right side with respect to the nut portion 51c. The ball bearing 56 is fastened by a nut 57 screwed on the male threaded end portion 51bb to the control rod 51 so as to be sandwiched between the nut 57 and the nut portion 51c.

Accordingly, the control rod operating element 55 holds a right end portion of the control rod 51 for rotation.

A pin hole 55h is formed in a cylindrical portion of the control rod operating element 55, which extends to the right side with respect to the nut 57 screwed on the control rod operating element 55 such that it is perforated in a diametrical direction, and a shift pin 58 extends through the pin hole 55h.

Figure 14:
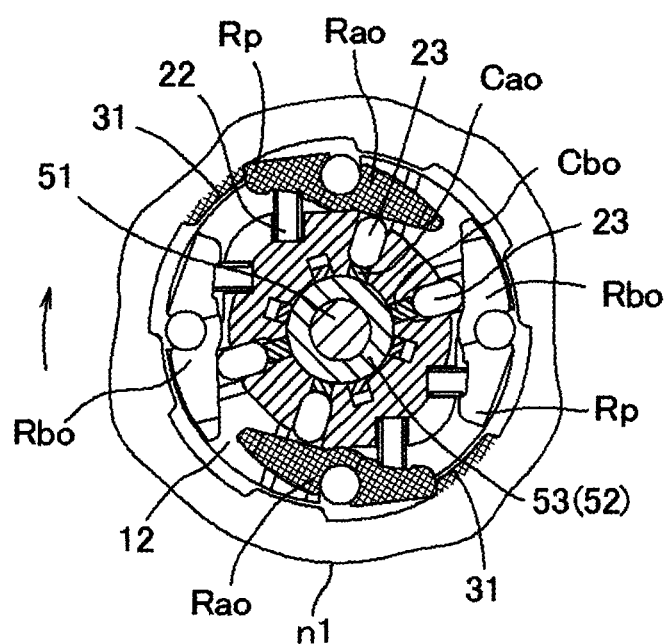
FIG. 14 is a sectional view taken along line XIV-XIV of FIG. 13.

The shift pin 58 extends through the control rod operating element 55 and projects to only one side (refer to FIG. 2), and as shown in FIG. 14, the projecting end portion of the shift pin 58 is a cylindrical engaging portion 58a which slidably engages with a shift guide groove 67v of a shift drum 67 hereinafter to be described. A sliding portion 58b of a parallelepiped shape is formed on the shift pin 58 between a small diameter cylindrical portion 58c, which extends through the control rod operating element 55, and the engaging portion 58a.

A groove 60 is formed on a guide portion 1Ra of the right engine case 1R, which projects rightwardly from the side wall 1RR such that it is directed in the leftward and rightward direction, and the sliding portion 58b of a parallelepiped shape of the shift pin 58 is fitted for sliding movement in the groove 60 to stop rotation of the shift pin 58.

A support shaft 65 is mounted on the side wall 1RR such that it projects rightwardly, and the shift drum 67 is supported for rotation on the support shaft 65 through bearings 66. The projecting engaging portion 58a of the shift pin 58 is fitted for sliding movement in a shift groove 67v of the shift drum 67.

The shift groove 67v of the shift drum 67 is formed in such a manner as to draw a spiral over a substantially full circumference on a drum outer circumferential face. Within the range of the shift groove 67v, shift stage positions for the first to sixth speeds are formed at predetermined rotational angles (for example, 60 degrees) and neutral positions are formed intermediately between the shift stage positions.

Accordingly, rotation of the shift drum 67 moves the shift pin 58 fitted in the shift groove 67v in an axial direction together with the control rod operating element 55.

Since the control rod operating element 55 holds a right end portion of the control rod 51 for rotation, the rotation of the shift drum 67 after all moves the control rod 51 in an axial direction.

The shift drum 67 is rotated through shift transmission device (not shown) by a manual manipulation of a shift select lever not shown.

The shift transmission device includes a mechanism such as a shift cam member for stably keeping the shift drum 67 at any of shift stage positions at the predetermined angles and transmits the manipulation power of the shift select lever to a gear wheel 70 formed on a side edge of the shift drum 67 to successively rotate the shift drum 67 to the shift stage positions.

It is to be noted that the shift drum 67 may be rotated by a speed changing motor.

As described above, in the speed change driving device 50, the shift drum 67 is rotated by a manual manipulation of the shift select lever (or by driving of the speed changing motor), and the rotation of the shift drum 67 guides the shift pin 58 fitted in the shift groove 67v to move the shift pin 58 in an axial direction of the shift drum 67. The movement of the shift pin 58 moves the control rod 51 in an axial direction through the control rod operating element 55, and the movement of the control rod 51 moves the eight cam rods Cao, Cao, Cae, Cae, Cbo, Cbo, Cbe and Cbe of the engaging device 20 through the lost motion mechanisms 52 and 53.

The control rod 51 to which the lost motion mechanisms 52 and 53 are assembled is inserted in the hollow of the counter gear wheel shaft 12 and disposed on the center axis of the counter gear wheel shaft 12.

The counter gear wheel shaft 12 of a hollow cylindrical shape has an inner diameter substantially equal to the outer diameter of the spring holders 52h and 53h of the lost motion mechanisms 52 and 53 and receives the spring holders 52h and 53h attached to the control rod 51 for sliding movement therein.

Figure 9:
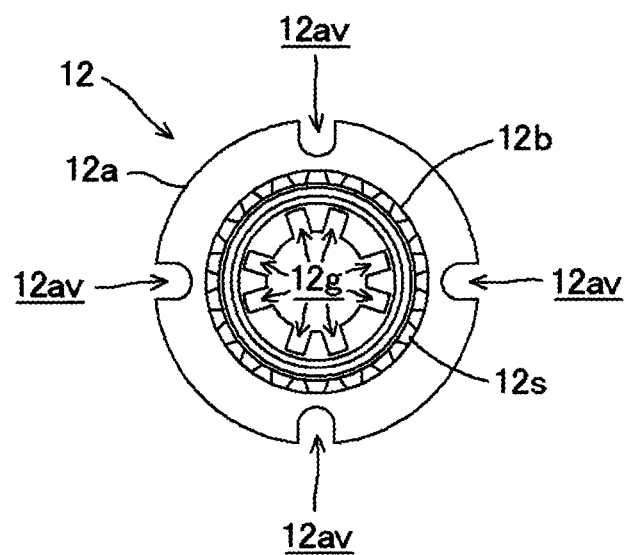
FIG. 9 is a left side elevational view (view as viewed in a direction indicated by an arrow mark IX of FIG. 8) of the counter gear wheel shaft.

Further, eight cam guide grooves 12g of a rectangular cross section are formed at different radial positions on an inner circumferential face of the hollow of the counter gear wheel shaft 12 such that they extend in the axial direction (refer to FIG. 9).

The eight cam rods Cao, Cao, Cae, Cae, Cbo, Cbo, Cbe and Cbe are fitted for sliding movement in the cam guide grooves 12g which correspond to them in an array shown in FIG. 7. Those cam rods C which belong to a same kind are disposed at symmetrical positions.

The cam guide grooves 12g for preventing rotation of the cam rods C with respect to the counter gear wheel shaft 12 have a simple shape of a channel-shaped cross section and can be worked readily.

The depth of the cam guide grooves 12g is equal to the width of the cam rods C in a radial direction, and consequently, the cam face which is an outer peripheral side face of each of the cam rods C slidably contacts with the bottom face of the corresponding cam guide groove 12g. Meanwhile, the inner peripheral side face of the cam rod C is substantially in register with the inner circumferential face of the hollow and contacts with the outer circumferential faces of the spring holders 52h and 53h. The locking pawls p projecting from the inner peripheral side face of any cam rod C grasp one of the spring holders 52h and 53h in such a manner as to sandwich the latter from the opposite sides.

Figure 8:
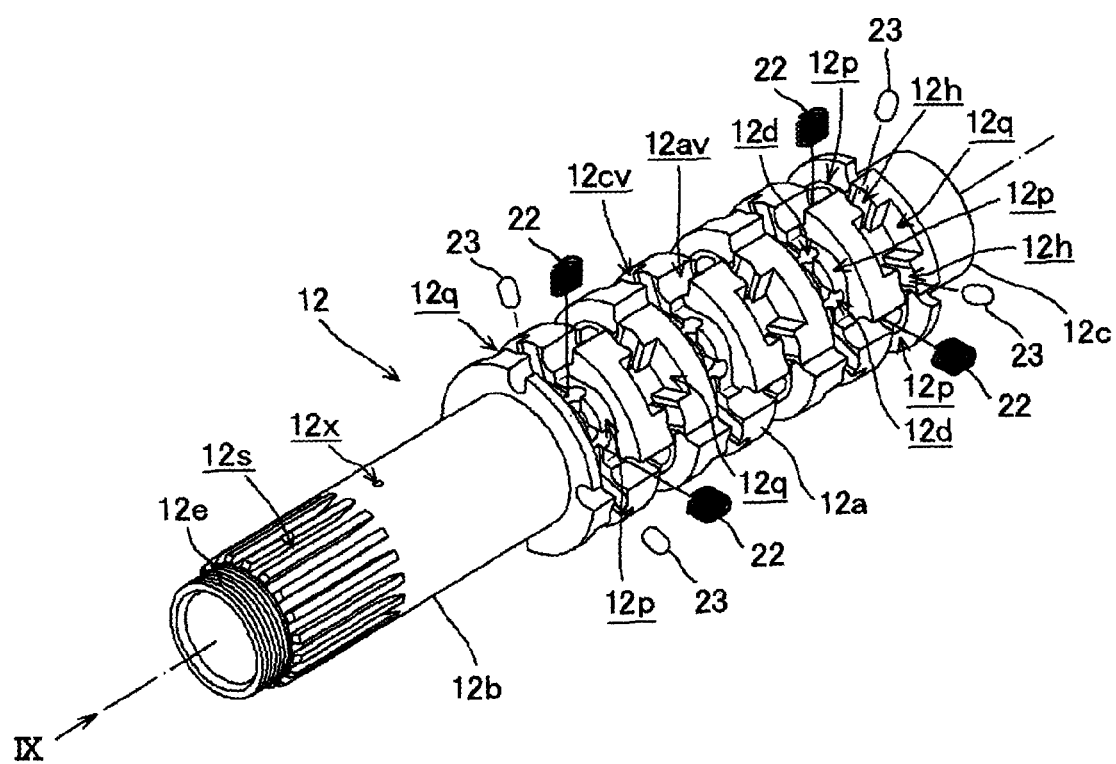
FIG. 8 is an exploded perspective view of the counter gear wheel shaft and some of pin members and springs.

The counter gear wheel shaft 12 of a hollow cylindrical shape has a central cylindrical portion 12a, on which the driven speed change gear wheels n are supported for rotation with the bearing collar members 13 interposed therebetween, and a left side cylindrical portion 12b and a right side cylindrical portion 12c formed on the opposite left and right sides of the central cylindrical portion 12a, respectively, and having a reduced outer diameter (refer to FIG. 8).

Figure 2:
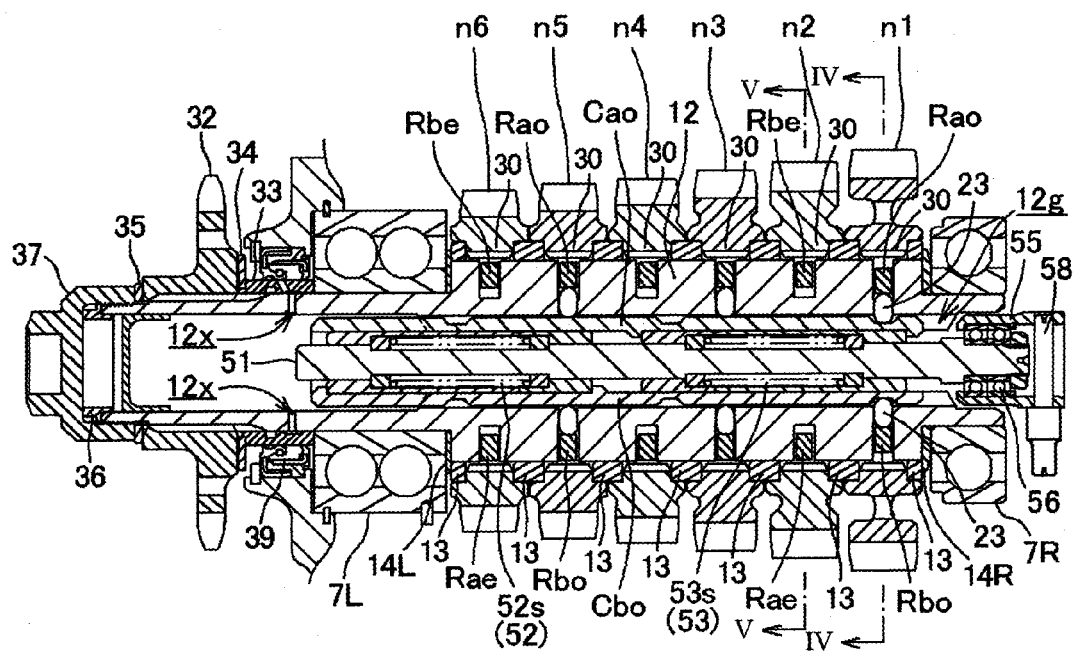
FIG. 2 is a sectional view showing a structure of a counter gear wheel shaft and elements around the same (sectional view taken along line II-II of FIGS. 4 and 5).
Figure 3:
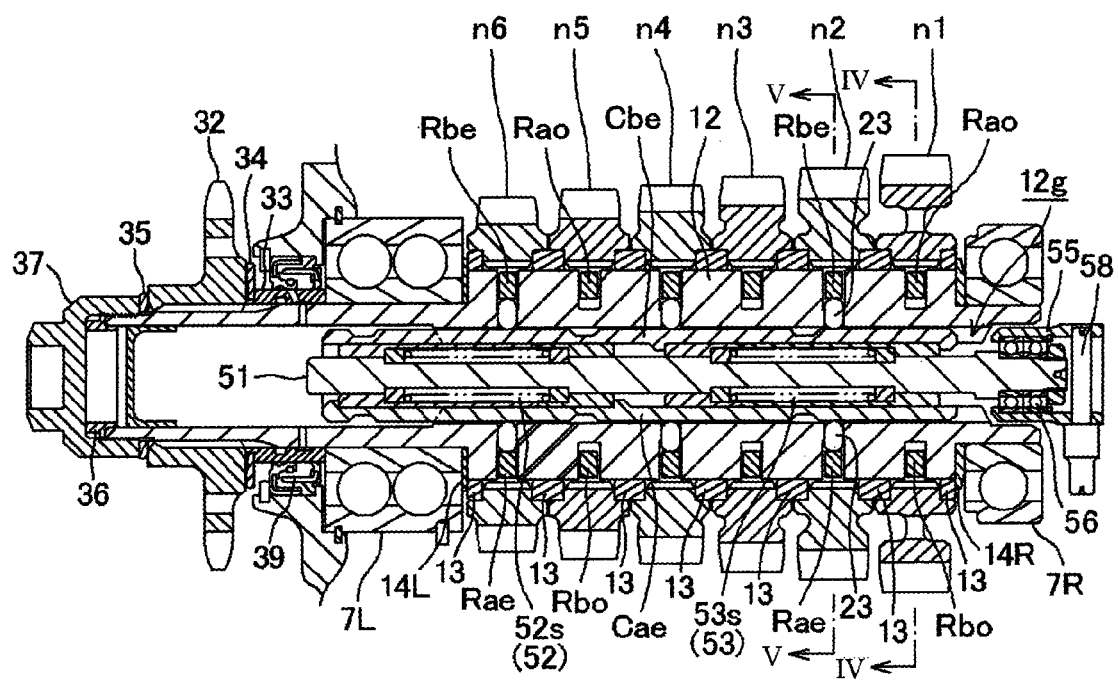
FIG. 3 is another sectional view showing the structure of the counter gear wheel shaft and elements around the same (sectional view taken along line III-III of FIGS. 4 and 5).
Figure 4:
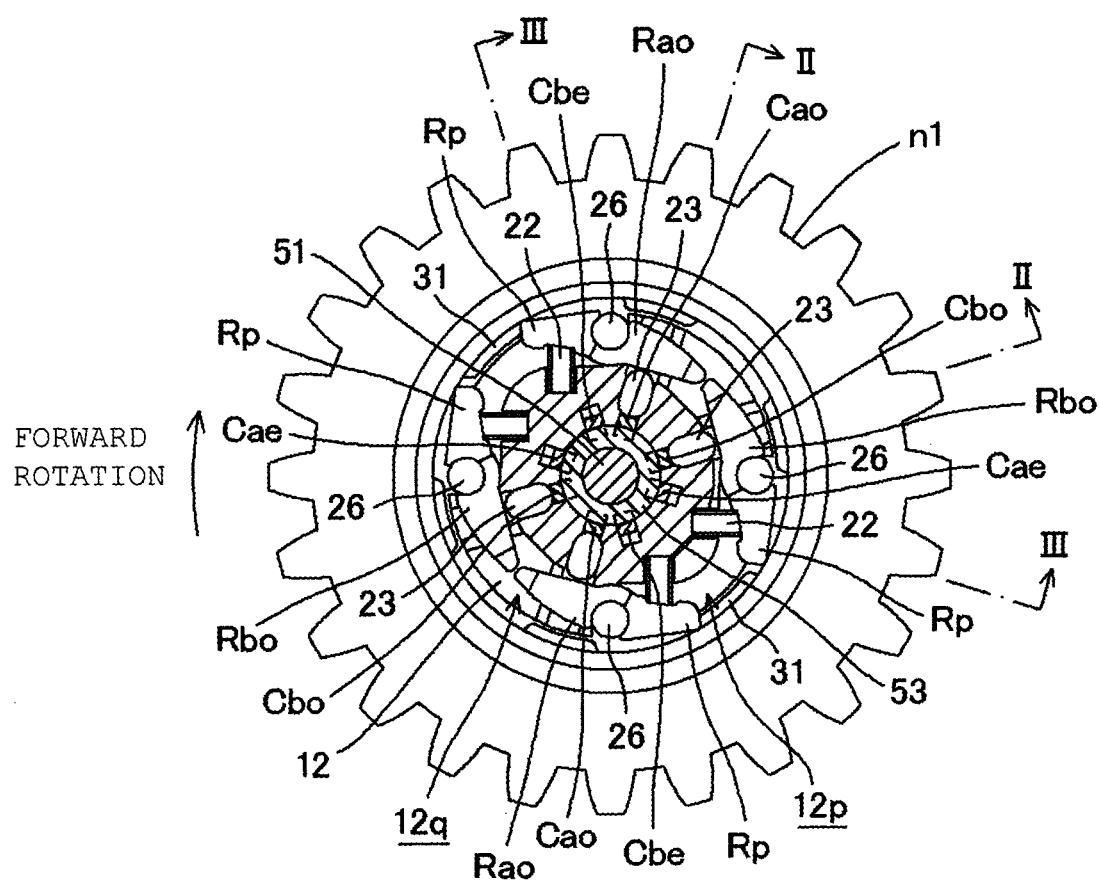
FIG. 4 is a sectional view taken along line IV-IV of FIGS. 2 and 3.
Figure 5:
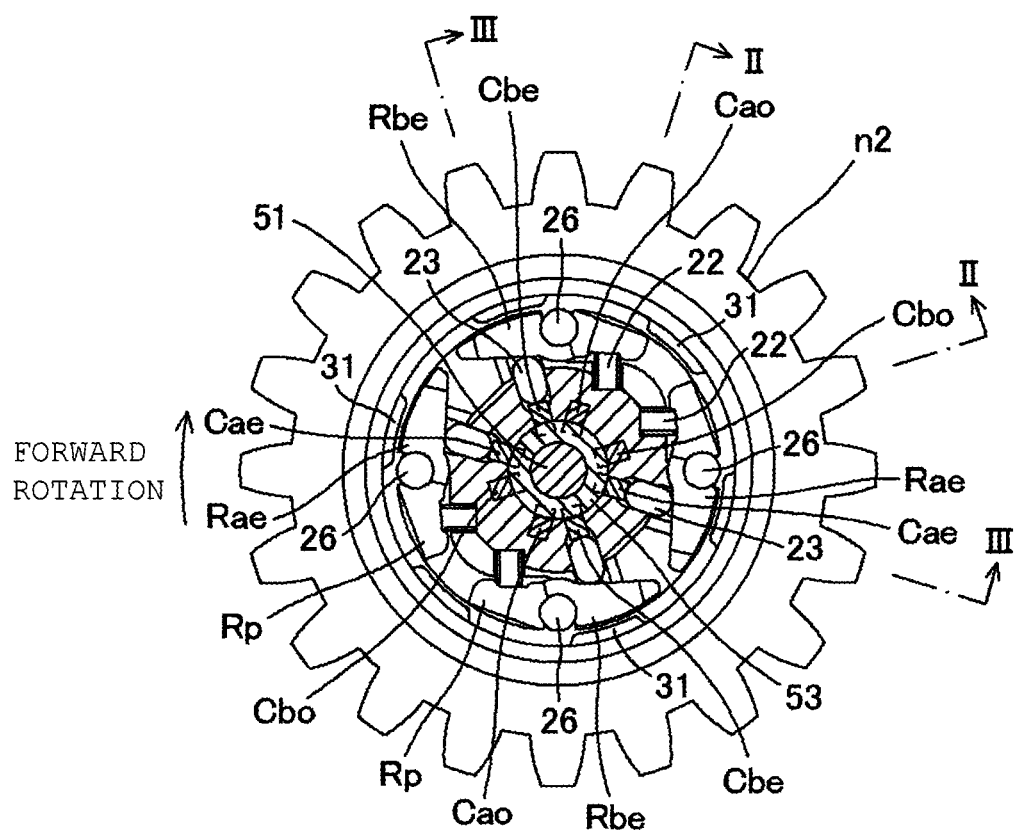
FIG. 5 is a sectional view taken along line V-V of FIGS. 2 and 3.

The bearing 7L is fitted on the left side cylindrical portion 12b of the counter gear wheel shaft 12 with the collar member 14L interposed therebetween while the bearing 7R is fitted on the right side cylindrical portion 12c with the collar member 14R interposed therebetween (refer to FIGS. 1, 2 and 3).

It is to be noted that an axial end portion of the left side cylindrical portion 12b of the counter gear wheel shaft 12 is reduced in outer diameter and has male threads 12e formed thereon, and spline grooves 12s with which the output sprocket wheel 32 is spline-fitted are formed on the inner side with respect to the male threads 12e in the axial direction.

In the hollow of the counter gear wheel shaft 12, a small diameter inner circumferential face on which the cam guide grooves 12g are formed (FIG. 9) and which has an inner diameter equal to the outer diameter of the spring holders 52h and 53h and large diameter inner circumferential faces which have inner diameters on opposite sides substantially equal to the diameter of the bottom faces of the cam guide grooves 12g are formed (refer to FIGS. 2 and 3).

The control rod operating element 55 is inserted by approximately one half thereof in the inside of the right side increased inner diameter portion. If the control rod 51, lost motion mechanisms 52 and 53 and eight cam rods Cao, Cao, Cae, Cae, Cbo, Cbo, Cbe and Cbe are incorporated in the hollow of the counter gear wheel shaft 12 in this manner, then all of them rotate together. If the control rod 51 moves in an axial direction, then the reverse rotation odd-numbered stage cam rods Cbo and the forward rotation even-numbered stage cam rods Cae are moved in an interlocking relationship in the axial direction through the coil spring 52s of the left side lost motion mechanism 52 while the forward rotation odd-numbered stage cam rods Cao and the reverse rotation even-numbered stage cam rods Cbe are moved in an interlocking relationship in the axial direction through the coil spring 53s of the right side lost motion mechanism 53.

Since the lost motion mechanisms 52 and 53 are interposed in a juxtaposed relationship in the axial direction of the counter gear wheel shaft 12 between the outer circumferential face of the control rod 51 and the inner side face of the plural cam rods C, expansion of the multistage speed change gear 10 in the axial direction is avoided by the structure wherein the control rod 51, lost motion mechanisms 52 and 53 and cam rods C overlap with each other in a radial direction in the hollow of the counter gear wheel shaft 12. Further, the lost motion mechanisms 52 and 53 can be accommodated compactly in the hollow of the counter gear wheel shaft 12 to achieve miniaturization of the multistage speed change gear 10 itself.

Since the two lost motion mechanisms 52 and 53 are provided in the axial direction on the control rod 51 and move the cam rods C different from each other in an interlocking relationship, it is possible to cause the plural cam rods C to make two different movements from each other in response to movement of the single control rod 51 to smoothen the speed change. Further, the lost motion mechanisms 52 and 53 are formed in the same structure to suppress the fabrication cost and facilitate part management upon assembly.

In the lost motion mechanisms 52 and 53, the coil springs 52s and 53s are interposed in spaces formed from the outer circumferential recessed portions 51a and 51b of the control rod 51 and the inner circumferential recessed portions 52ha and 53ha of the spring holders 52h and 53h which are interposed between the outer circumferential face of the control rod 51 and the inner side face of the plural cam rods C. Therefore, the lost motion mechanisms 52 and 53 of the same shape can be configured on the control rod 51.

Further, since, in the lost motion mechanism 52 (53), the cotter 52c is formed as a split two-piece cotter and the spring holder 52h (53h) is split into two pieces including the long holder 52h1 (53h1) and the short holder 52hs (53hs), even if an increased diameter stopper portion 51as (51bs) is formed at a central portion in the axial direction of the outer circumferential recessed portion 51a (51b) of the control rod 51, it is possible to readily dispose the split cotters 52c in the recessed portions on the opposite sides of the increased diameter stopper portion 51as (51bs) to assemble the spring holder 52h (53h) and facilitate assembly of the lost motion mechanism 52 (53).

As shown in FIG. 8, the central cylindrical portion 12a on which the driven speed change gear wheels n are supported for rotation with the bearing collar members 13 of the counter gear wheel shaft 12 interposed therebetween has a greater outer diameter and is configured with a great thickness, and six circumferential grooves 12cv of a small width extending fully in a circumferential direction on the outer circumferential portion of the great thickness are formed at equal intervals along the axial direction in a corresponding relationship to the first, second, third, fourth, fifth and sixth driven speed change gear wheels n1, n2, n3, n4, n5 and n6. Further, four axial grooves 12av directed in the axial direction are formed at equal intervals over a circumferential direction.

Further, on the outer circumferential portion of the central cylindrical portion 12a of the counter gear wheel shaft 12, four portions separated by the four axial grooves 12av are formed such that long rectangular recessed portions 12p formed with the groove width of the circumferential grooves 12cv expanded long uniformly to the left and the right between adjacent ones of the axial grooves 12av and short rectangular recessed portions 12q formed with the groove width of the circumferential grooves 12cv expanded uniformly to the left and the right within a portion between adjacent ones of the axial grooves 12av are formed alternately in the axial direction.

A pair of spring receiving portions 12d recessed a little across the circumferential grooves 12cv and having an elliptic shape elongated in an axial direction are formed at different places of the bottom face of the long rectangular recessed portions 12p, which are spaced from each other in a circumferential direction.

Further, pin holes 12h are perforated in a diametrical direction to the cam guide grooves 12g on the circumferential grooves 12cv on the thick portions between the short rectangular recessed portions 12q and the axial grooves 12av. In particular, such pin holes 12h are perforated in a radial direction of the cam guide grooves 12g formed at eight positions in a circumferential direction from the inner circumferential face of the hollow of the counter gear wheel shaft 12. Four such pin holes 12h are formed on each of the circumferential grooves 12cv.

Further, in each spring receiving portion 12d, a compression spring 22 wound in an elliptic shape is fitted at an end portion thereof.

A pin member 23 is fitted for sliding movement in each pin hole 12h. It is to be noted that the width of each cam guide groove 12g with which the pin hole 12h is communicated is smaller than the outer diametrical width of the pin member 23. Accordingly, since the pin member 23 which moves back and forth in the pin hole 12h comes off to the cam guide groove 12g, assembly of the engaging device 20 to the counter gear wheel shaft 12 is facilitated.

Since a cam rod C is fitted for sliding movement in each of the cam guide grooves 12g, the pin member 23 fitted in each pin hole 12h contacts at a center side end portion thereof with the cam face of the cam rod C, and if the cam groove V corresponds to the pin hole 12h by movement of the cam rod C, then the pin member 23 drops into the cam groove v, but if the sliding contact face other than the cam groove v corresponds to the pin hole 12h, then the pin member rides on the sliding contact face and is moved back and forth by the movement of the cam rod C.

The back and forth movement of the pin member 23 in the pin hole 12h is projected and retracted at a centrifugal side end portion of the pin member 23 to and from the outer side through the bottom face of the circumferential groove 12cv.

Rocking pawl members R are provided in each circumferential groove 12cv communicating between both recessed portions of the long rectangular recessed portions 12p and the short rectangular recessed portions 12q formed on the outer circumferential portion of the central cylindrical portion 12a of the counter gear wheel shaft 12 having such a structure as described above, and a pivot pin 26 for supporting the rocking pawl member R for rocking motion is provided in an axial groove 12ay.

Figure 11:
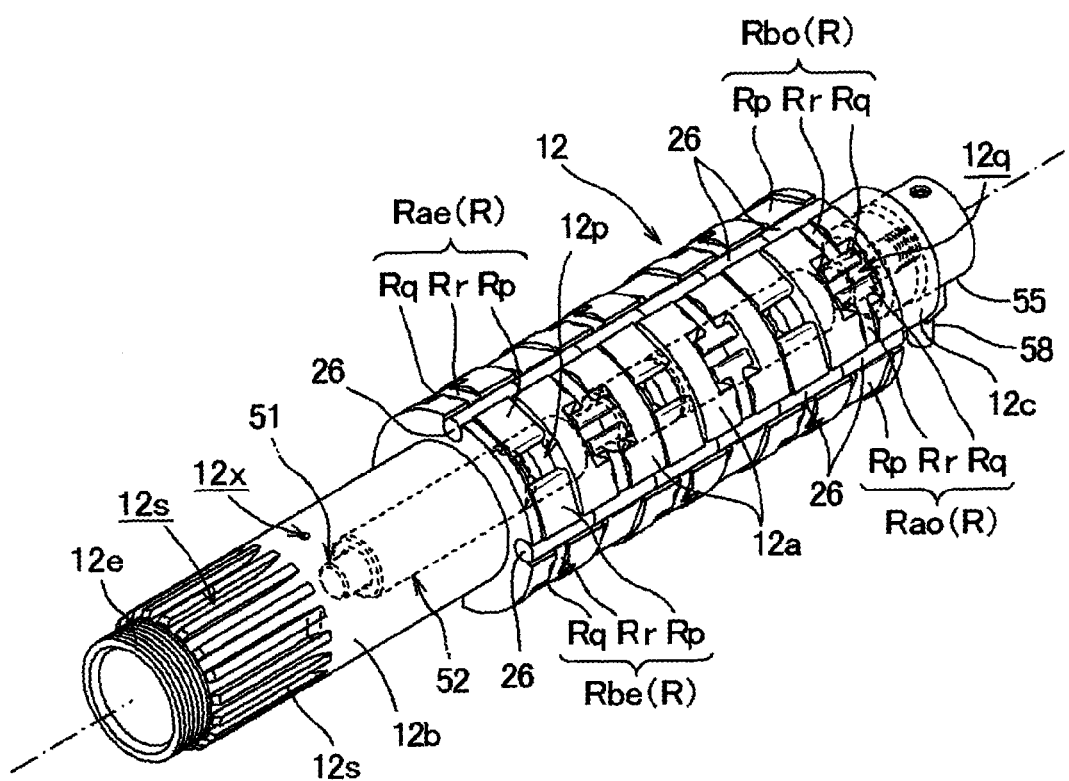
FIG. 11 is a perspective view illustrating a state in which some of speed changing driving device and engaging device are assembled to the control rod.

A state in which all rocking pawl members R are assembled in this manner is illustrated in FIG. 11.

Figure 10:
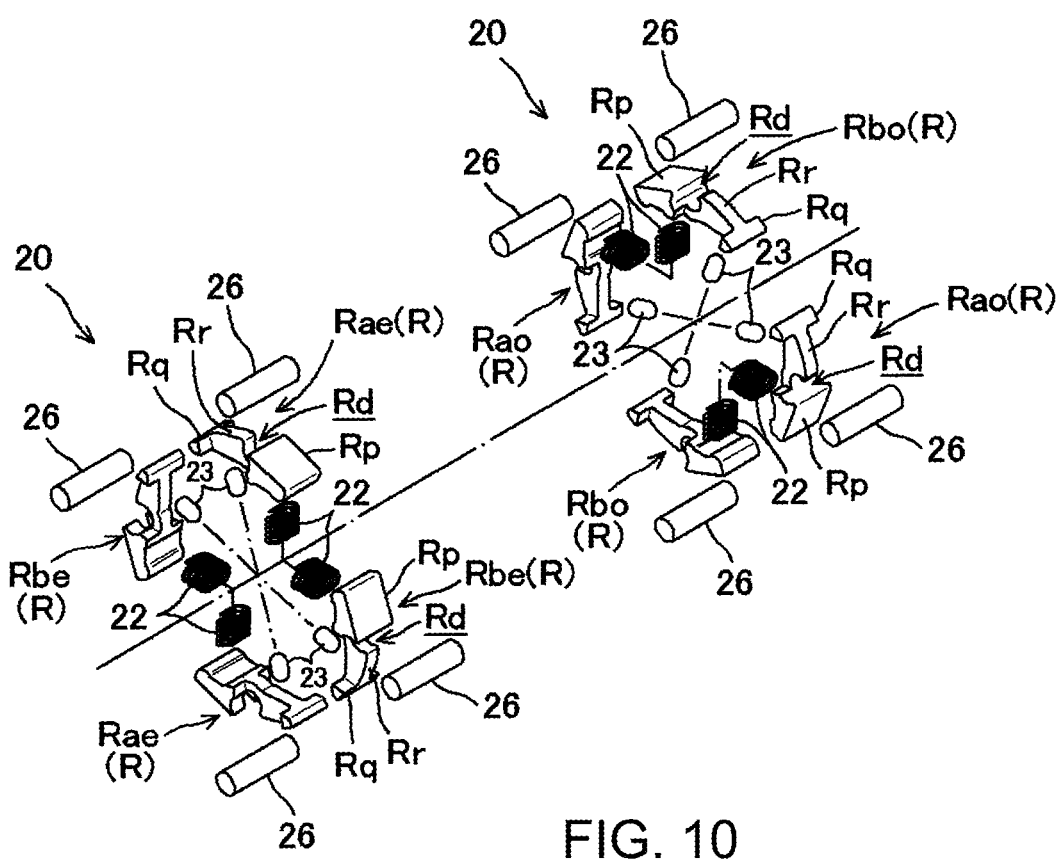
FIG. 10 is an exploded perspective view of a rocking pawl member and a pivot pin, a pin member and the spring.

In the exploded perspective view of FIG. 10, four rocking pawl members R provided in the circumferential grooves 12cv and the long rectangular recessed portions 12p and short rectangular recessed portions 12q corresponding to the odd-numbered stage gear wheels (first, third and fifth driven speed change gear wheels n1, n3 and n5) and four rocking pawl members R provided in the circumferential grooves 12cv and the long rectangular recessed portions 12p and short rectangular recessed portions 12q corresponding to the even-numbered stage gear wheels of the even-numbered stages (second, fourth and sixth driven speed change gear wheels n2, n4 and n6) are shown in postures having a relative angular positional relationship among them. In addition, the pivot pins 26 for supporting the rocking pawl members R and the compression springs 22 and the pin members 23 which act on the rocking pawl members R are shown.

All of the rocking pawl members R have the same shape and have a substantially arcuate shape as viewed in an axial direction, and an outer peripheral portion of a through-hole through which a pivot pin 26 extends is cut away to form a bearing recessed portion Rd at a middle portion of each of the rocking pawl members R. Further, on one side with respect to the center of rocking motion of the bearing recessed portion Rd, a wide rectangular engaging pawl portion Rp which fits for rocking motion in the long rectangular recessed portion 12p is formed, and on the other side, a narrow pin receiving portion Rr which fits for rocking motion in the circumferential groove 12cv in which the pin hole 12h is formed extends. An end portion of the pin receiving portion Rr extends to the short rectangular recessed portion 12q, and a wide end portion Rq expanded to a great width is formed at the end portion.

The rocking pawl member R is fitted at the pin receiving portion Rr thereof in the circumferential groove 12cv in which the pin hole 12h is formed, and the engaging pawl portion Rp is fitted in the long rectangular recessed portion 12p and the bearing recessed portion Rd is aligned with the axial groove 12av while the other wide end portion Rq is fitted in the short rectangular recessed portion 12q.

Then, the pivot pin 26 is fitted into the bearing recessed portion Rd and the axial groove 12av which are aligned with each other.

The rocking pawl member R is formed in a leftwardly and rightwardly symmetrical state with respect to the circumferential groove 12cv with which it is to be fitted. The wide rectangular engaging pawl portion Rp of the rocking pawl member R is heavier than the pin receiving portion Rr and the wide end portion Rq such that, when the rocking pawl member R is supported by the pivot pin 26 and rotated together with the counter gear wheel shaft 12, the engaging pawl portion Rp acts as a weight with regard to the centrifugal force to rock the rocking pawl member R so that it is projected outwardly in the centrifugal direction.

The pin receiving portion Rr of the rocking pawl member R is formed with a width smaller than that on the engaging pawl portion Rp side which is the opposite side with respect to the center of the rocking motion.

Further, since it is only necessary for the pin receiving portion Rr to have a width sufficient to receive the pin member 23, the rocking pawl member R can be formed in a small size and besides rocking motion of the other engaging pawl portion Rp by the centrifugal force is facilitated.

Since the rocking pawl members R positioned adjacent to each other in a circumferential direction are assembled in symmetrical postures to each other to the counter gear wheel shaft 12, the engaging pawl portions Rp which are opposed to each other with a predetermined distance left therebetween are fitted into the common long rectangular recessed portion 12p while the other wide end portions Rq which are positioned adjacent to each other are fitted into the common short rectangular recessed portion 12q.

The compression spring 22 supported at one end thereof to the spring receiving portion 12d of the counter gear wheel shaft 12 is interposed on the inner side of the engaging pawl portion Rp of the rocking pawl member R, and the pin member 23 fitted in the pin hole 12h is interposed between the inner side of the pin receiving portion Rr and the cam rod C.

In this manner, each rocking pawl member R is supported for rocking motion on the pivot pin 26 and provided in the long rectangular recessed portion 12p and short rectangular recessed portion 12q and the circumferential groove 12cv of the counter gear wheel shaft 12, and the engaging pawl portion Rp is biased to the outer side by the compression spring 22 while the pin receiving portion Rr is pushed by forward and backward movement of the pin member 23 to rock the rocking pawl member R against the biasing force of the compression spring 22.

When the pin member 23 advances in the centrifugal direction to rock the rocking pawl member R, the engaging pawl portion Rp of the rocking pawl member R is retracted into the long rectangular recessed portion 12p, and consequently, nothing projects to the outer side from the outer circumferential face of the central cylindrical portion 12a of the counter gear wheel shaft 12.

On the other hand, when the pin member 23 is retracted, the engaging pawl portion Rp biased by the compression spring 22 is projected to the outer side from the outer circumferential face of the central cylindrical portion 12a of the counter gear wheel shaft 12 so as to be engageable with the driven speed change gear wheel n.

The compression spring 22 has an elliptic shape having a major diameter along the axial direction of the counter gear wheel shaft 12. The compression spring 22 of an elliptic shape has a major diameter greater than the width of the pin receiving portion Rr of the rocking pawl member R and is received across the circumferential grooves 12cv which are formed over a circumference in a circumferential direction in which the pin receiving portion Rr is fitted for rocking motion. Therefore, working of the counter gear wheel shaft 12 is facilitated, and the rocking pawl member R can be assembled stably to the counter gear wheel shaft 12.

The four rocking pawl members R corresponding to the odd-numbered stage gear wheels (first, third and fifth driven speed change gear wheels n1, n3 and n5) and four rocking pawl members R corresponding to the even-numbered stage gear wheels of the even-numbered stages (second, fourth and sixth driven speed change gear wheels n2, n4 and n6) have such a relative angular positional relationship that the former and the latter are angularly spaced by 90 degrees from each other around the axis.

The four rocking pawl members R corresponding to the odd-numbered stage gear wheels (first, third and fifth driven speed change gear wheels n1, n3 and n5) are provided such that a pair of forward rotation odd-numbered stage rocking pawl members Rao which are abutted in the forward rotation direction of the gear wheels and engage so that the odd-numbered stage driven speed change gear wheels n1, n3 and n5 and the counter gear wheel shaft 12 rotate in synchronism with each other, and a pair of reverse rotation odd-numbered stage engaging members Rbo which are abutted in the reverse rotation direction of the gear wheels and engage so that odd-numbered stage driven speed change gear wheels n1, n3 and n5 and the counter gear wheel shaft 12 rotate in synchronism with each other, are provided individually at symmetrical positions.

Similarly, the four rocking pawl members R corresponding to the even-numbered stage gear wheels (second, fourth and sixth driven speed change gear wheels n2, n4 and n6) are provided such that a pair of forward rotation even-numbered stage rocking pawl members Rae which are abutted in the forward rotation direction of the gear wheels and engage so that the even-numbered stage driven speed change gear wheels n2, n4 and n6 and the counter gear wheel shaft 12 rotate in synchronism with each other, and a pair of reverse rotation even-numbered stage engaging members Rbe which are abutted in the reverse rotation direction of the gear wheels and engage so that the even-numbered stage driven speed change gear wheels n2, n4 and n6 and the counter gear wheel shaft 12 rotate in synchronism with each other, are provided individually at symmetrical positions.

Each forward rotation odd-numbered stage rocking pawl member Rao is rocked by the pin member 23 which is moved back and forth by movement of the forward rotation odd-numbered stage cam rod Cao, and the reverse rotation odd-numbered stage engaging member Rbo is rocked by the pin member 23 which is moved back and forth by movement of the reverse rotation odd-numbered stage cam rod Cbo.

Similarly, each forward rotation even-numbered stage rocking pawl member Rae is rocked by the pin member 23 which is moved back and forth by movement of the forward rotation even-numbered stage cam rod Cae, and the reverse rotation even-numbered stage engaging member Rbe is rocked by the pin member 23 which is moved back and forth by movement of the reverse rotation even-numbered stage cam rod Cbe.

When the engaging device 20 are to be incorporated into the counter gear wheel shaft 12, the bearing collar member 13 at the right end is first fitted outwardly to an outer circumferential end portion of the central cylindrical portion 12a, and the engaging device 20 at the right end is assembled such that one end of each pivot pin 26 is fitted into an axial groove 12av on the inner side of the bearing collar member 13. Then, the next bearing collar member 13 is outwardly fitted in such a manner as to cover the other end of the pivot pin 26, and then the engaging device 20 for the next stage is assembled similarly as in the assembly for the preceding stage. The sequence of operations is repeated successively, and finally the bearing collar member 13 at the left end is externally fitted, thereby ending the assembly operation.

Figure 12:
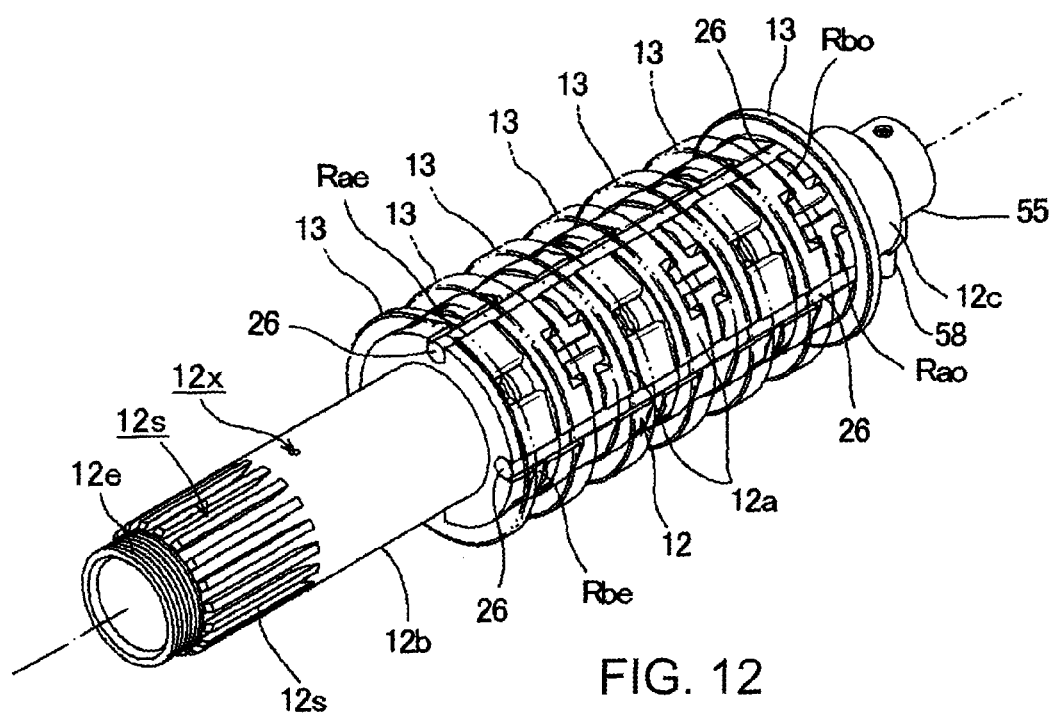
FIG. 12 is a perspective view illustrating a state in which one bearing collar member is outwardly fitted on the counter gear wheel shaft in the state illustrated in FIG. 11.

As shown in FIG. 12, the bearing collar member 13 is outwardly provided at axial positions other than the long rectangular recessed portions 12p and the short rectangular recessed portions 12q of the central cylindrical portion 12a and is disposed across adjacent ones of the pivot pins 26 embedded continuously in a line in the axial grooves 12av to prevent coming off of the pivot pins 26 and the rocking pawl members R.

Since the pivot pins 26 embedded in the axial grooves 12av of the central cylindrical portion 12a of the counter gear wheel shaft 12 are embedded in the depth by which the pivot pin 26 contacts with the outer circumferential face of the central cylindrical portion 12a, they can be fixed without play if the bearing collar members 13 are fitted outwardly.

The seven bearing collar members 13 are outwardly provided at equal intervals on the counter gear wheel shaft 12, and the driven speed change gear wheels n are supported for rotation in such a manner as to extend across adjacent ones of the bearing collar members 13.

Each of the driven speed change gear wheels n has a pair of cutouts formed at left and right inner circumferential edge portions (left and right circumferential edge portions of the inner circumferential face) and has a thin annular rib 30 formed between the left and right cutouts. Left and right bearing collar members 13 engage for sliding movement with the cutouts in such a manner as to sandwich the rib 30 therebetween (refer to FIGS. 2 and 3).

Six engaging projections 31 are formed at equal distances in a circumferential direction on the rib 30 of the inner circumferential face of each of the driven speed change gear wheels n (refer to FIGS. 2, 3, 4 and 5).

The engaging projections 31 are thin and have an arcuate shape as viewed in side elevation (as viewed in an axial direction shown in FIGS. 4 and 5), and the opposite end faces thereof in a circumferential direction serve as engaging faces for engaging with the engaging pawl portion Rp of the rocking pawl member R described hereinabove.

The forward rotation odd-numbered stage rocking pawl member Rao (forward rotation even-numbered stage rocking pawl member Rae) and the reverse rotation odd-numbered stage engaging members Rbo (reverse rotation even-numbered stage engaging members Rbe) have the engaging pawl portions Rp extending toward the opposite sides to each other. The forward rotation odd-numbered stage rocking pawl member Rao (forward rotation even-numbered stage rocking pawl member Rae) is abutted and engaged with an engaging projection 31 in the forward rotation direction of the driven speed change gear wheel n (and the counter gear wheel shaft 12), and the reverse rotation odd-numbered stage engaging member Rbo (reverse rotation even-numbered stage engaging member Rbe) is abutted and engaged with the engaging projection 31 in the reverse rotation direction of the driven speed change gear wheel n.

It is to be noted that the forward rotation odd-numbered stage rocking pawl members Rao (forward rotation even-numbered stage rocking pawl members Rae) do not engage, in the reverse rotation direction of the driven speed change gear wheel n, with the engaging pawl portion Rp even if the engaging pawl portion Rp projects to the outside, and similarly, the reverse rotation odd-numbered stage engaging members Rbo (reverse rotation even-numbered stage engaging members Rbe) do not engage, in the forward rotation direction of the driven speed change gear wheel n, with the engaging pawl portion Rp even if the engaging pawl portion Rp projects to the outside.

A procedure of assembling the engaging device 20 described above to the counter gear wheel shaft 12 is described.

The two left and right lost motion mechanisms 52 and 53 are assembled to the control rod 51 to which the control rod operating element 55 and the shift pin 58 are assembled, and then are fitted into the hollow of the counter gear wheel shaft 12 in a state in which the eight cam rods Cao, Cao, Cae, Cae, Cbo, Cbo, Cbe and Cbe are disposed on the outer periphery of the lost motion mechanisms 52 and 53.

Thereupon, the eight cam rods Cao, Cao, Cae, Cae, Cbo, Cbo, Cbe and Cbe are inserted into the eight corresponding cam guide grooves 12g.

Then, the leftward and rightward movement positions of the eight cam rods Cao, Cao, Cae, Cae, Cbo, Cbo, Cbe and Cbe with respect to the counter gear wheel shaft 12 are set so as to be the neutral positions.

The counter gear wheel shaft 12 which is in such a state as described above is so postured that it is erected with the left positioned upwardly.

Then, the right end bearing collar member 13 is outwardly fitted to the lower end (right end) of the central cylindrical portion 12a as indicated by solid lines in FIG. 12 first, and then the pin members 23 are inserted into the pin holes 12h of the circumferential grooves 12cv corresponding to the first driven speed change gear wheel n1 positioned most downwardly, and the compression springs 22 are received at one end thereof by the spring receiving portions 12d and then the rocking pawl members R are fitted into the long rectangular recessed portions 12p, short rectangular recessed portions 12q and circumferential grooves 12cv. Then, the pivot pins 26 are fitted into the axial grooves 12av on the inner side of the bearing collar member 13 at the right end and are simultaneously fitted into the bearing recessed portions Rd of the rocking pawl members R to assemble the rocking pawl members R.

The cam rods C are at the neutral position, and the pin members 23 contact with the sliding contact faces other than the cam grooves to press the wide end portions Rq of the rocking pawl members R from the inner side to rock the rocking pawl members R against the biasing force of the compression springs 22 so as to retract the engaging pawl portions Rp in the long rectangular recessed portions 12p to establish a state in which nothing of the rocking pawl members R projects to the outer side from the outer circumferential face of the central cylindrical portion 12a.

After the four rocking pawl members R are assembled to the circumferential grooves 12cv corresponding to the first driven speed change gear wheel n1, the first driven speed change gear wheel n1 is fitted from above until the rib 30 of the first driven speed change gear wheel n1 is abutted with the bearing collar member 13 to engage with the cutout to assemble the first driven speed change gear wheel n1. Then, the second bearing collar member 13 is fitted from above until it is engaged with the cutout of the first driven speed change gear wheel n1 to be outwardly mounted at a predetermined position of the counter gear wheel shaft 12 thereby to position and attach the first driven speed change gear wheel n1 in the axial direction.

Then, the engaging device 20 for the second driven speed change gear wheel n2 is assembled and the second driven speed change gear wheel n2 is attached. Thereafter, such a sequence of operations as described above are repeated to successively assemble the remaining third, fourth, fifth and sixth driven speed change gear wheels n3, n4, n5 and n6, and finally, the seventh bearing collar member 13 is outwardly provided.

If, in the state in which the six driven speed change gear wheels n are assembled to the counter gear wheel shaft 12 in this manner, the counter gear wheel shaft 12 is supported for rotation on the left and right bearings 7L and 7R fitted in the left engine case 1L and the side wall 1RR of the right engine case 1R in such a manner as to be sandwiched by the bearings 7L and 7R through the collar members 14L and 14R, then the six driven speed change gear wheels n and the seven bearing collar members 13 are combined alternately and sandwiched from the opposite sides so that they are positioned in the axial direction.

The bearing collar members 13 support force of the driven speed change gear wheels n in an axial direction and can carry out positioning in the axial direction and receive thrust force.

The first, second, third, fourth, fifth and sixth driven speed change gear wheels n1, n2, n3, n4, n5 and n6 are supported for rotation on the counter gear wheel shaft 12 through the bearing collar members 13 in this manner.

Since the cam rods C are at the neutral position, all driven speed change gear wheels n are in a disengaged state in which, depending upon the moved position of the cam rods C of the corresponding engaging device 20, the pin members 23 are projected to push up the wide end portion Rq of the rocking pawl members R from the inner side while the engaging pawl portion Rp is retracted to the inner side, and rotate freely with respect to the counter gear wheel shaft 12.

On the other hand, if an engageable state in which, depending upon the moved positions of the cam rods C of the engaging device 20 other than the neutral position, the pin members 23 enter the cam grooves v to move the rocking pawl members R to project the engaging pawl portion Rp to the outer side is established, then the engaging projection 31 of the corresponding driven speed change gear wheel n is abutted with the engaging pawl portion Rp so that rotation of the driven speed change gear wheel n is transmitted to the counter gear wheel shaft 12 or rotation of the counter gear wheel shaft 12 is transmitted to the driven speed change gear wheel n.

In the speed change driving device 50, the shift drum 67 is rotated by a predetermined amount by a manual manipulation of the shift select lever, and the rotation of the shift drum 67 moves the control rod 51 in the axial direction by a predetermined amount through the shift pin 58 fitted in the shift groove 67v to move the eight cam rods Cao, Cao, Cae, Cae, Cbo, Cbo, Cbe and Cbe of the engaging device 20 through the lost motion mechanisms 52 and 53.

Speed change is carried out by moving the cam rods C in the axial direction to move the pin members 23, which slidably contact with the cam face of the cam rods C, back and forth to enter or leave the cam groove V, rocking the rocking pawl member R to cancel the engagement with the driven speed change gear wheel n, and changing the driven speed change gear wheel n to be engaged with the counter gear wheel shaft 12 by engagement with another driven speed change gear wheel n.

When speed change is to be carried out by a manual manipulation of the shift select lever, one time operation of the shift select lever rotates the shift drum 67 by a predetermined angle to move the control rod 51 by a predetermined amount (for one shift stage) through the shift pin 58 and the control rod operating element 55. Then, the shift select lever itself restores its original position and is prepared for next speed change.

FIGS. 2 to 5 illustrate an acceleration state at the first speed, and if the case in which speed change from the acceleration state of the first speed to the second speed by a manual manipulation of the shift lever is studied, then the shift drum 67 is rotated by a predetermined angle by the manual manipulation of the shift select lever and the control rod 51 is moved by a predetermined amount rightwardly in the axial direction through the shift pin 58.

When the control rod 51 moves rightwardly, the eight cam rods Cao, Cao, Cae, Cae, Cbo, Cbo, Cbe and Cbe tend to move rightwardly in the axial direction in an interlocking relationship through the coil springs 52s and 53s of the lost motion mechanisms 52 and 53. However, since the forward rotation odd-numbered stage rocking pawl members Rao of the forward rotation odd-numbered stage cam rods Cao which operate through the pin members 23 are held in engagement with the engaging projections 31 of the first driven speed change gear wheel n1 and acted upon by power from the first driven speed change gear wheel n1, high frictional resistance is applied when the forward rotation odd-numbered stage rocking pawl members Rao are rocked to cancel the engagement, and initially the forward rotation odd-numbered stage cam rods Cao are not moved suddenly. Therefore, also the reverse rotation even-numbered stage cam rods Cbe remain stopping. However, the forward rotation even-numbered stage cam rods Cae and reverse rotation odd-numbered stage cam rods Cbo move without such resistance.

By the movement of the reverse rotation odd-numbered stage cam rods Cbo, the reverse rotation odd-numbered stage engaging members Rbo for the first speed retract the engaging pawl portion Rp to the inner side.

Figure 13:
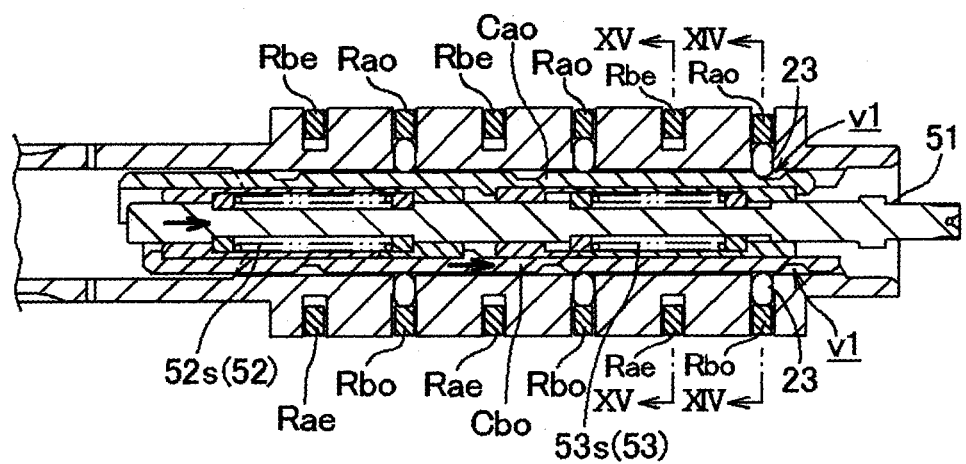
FIG. 13 is a sectional view showing a structure of the counter gear wheel shaft and elements around the same immediately before completion of shift-up to the second speed.
Figure 15:
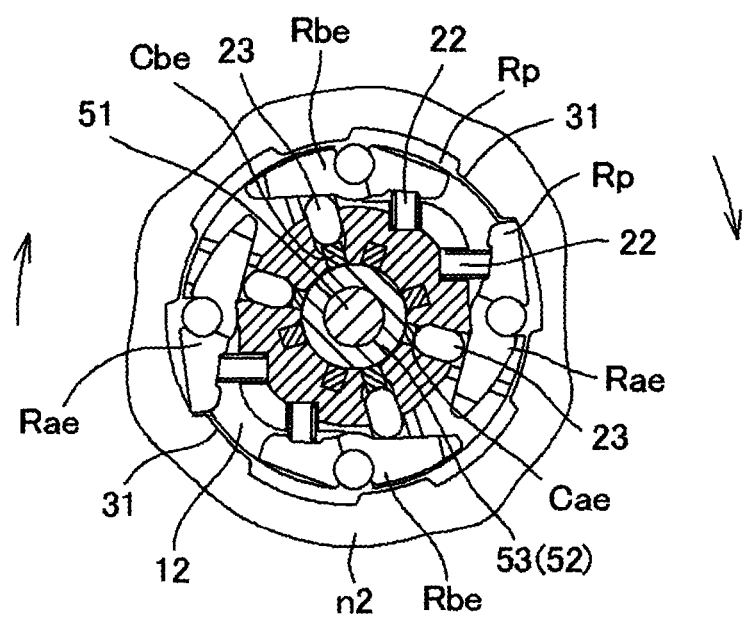
FIG. 15 is a sectional view taken along line XV-XV of FIG. 13.

Referring to FIGS. 13 to 15, by the movement of the forward rotation even-numbered stage cam rods Cae, the pin members 23 enter the cam groove v2, and consequently, the forward rotation even-numbered stage rocking pawl members Rae corresponding to the second driven speed change gear wheel n2 are rocked by the biasing force of the compression springs 22 and the centrifugal force of the engaging pawl portions Rp to project the engaging pawl portions Rp to the outer side thereby establishing an engageable state with the second driven speed change gear wheel n2. Then, an engaging projection 31 of the second driven speed change gear wheel n2 which is rotated at a high speed by the counter gear wheel shaft 12 rotating together with the first driven speed change gear wheel n1 catches up and is abutted with the engaging pawl portion Rp of the forward rotation even-numbered stage rocking pawl members Rae, which projects to the outer side.

FIGS. 13 to 15 illustrate a state immediately before an engaging projection 31 of the second driven speed change gear wheel n2 catches up the engaging pawl portion Rp of the forward rotation even-numbered stage rocking pawl members Rae, which projects to the outer side. In particular, FIG. 14 illustrates a state in which the engaging projections 31 of the first driven speed change gear wheel n1 engage with the forward rotation odd-numbered stage rocking pawl members Rao, and FIG. 15 illustrates a state immediately before the engaging projections 31 of the second driven speed change gear wheel n2 catch up the engaging pawl portions Rp of the forward rotation even-numbered stage rocking pawl members Rae, which projects to the outer side.

At this time, since the forward rotation odd-numbered stage rocking pawl members Rao remain in engagement with the engaging projections 31 of the first driven speed change gear wheel n1 and receives power from the first driven speed change gear wheel n1, the control rod 51 is moved. However, the forward rotation odd-numbered stage cam rods Cao remain stopping under the frictional resistance.

When the engaging projections 31 of the second driven speed change gear wheel n2 catch up the engaging pawl portions Rp of the forward rotation even-numbered stage rocking pawl members Rae, which projects to the outer side from the state illustrated in FIGS. 13 to 15, by the second driven speed change gear wheel n2 which rotates at a higher speed, the counter gear wheel shaft 12 begins to rotate at a rotational speed equal to that of the second driven speed change gear wheel n2, whereupon the engaging pawl portions Rp of the forward rotation odd-numbered stage rocking pawl members Rao are displaced from the engaging projections 31 of the first driven speed change gear wheel n1. Consequently, actual shift-up from the first speed to the second speed is executed.

When the engaging pawl portions Rp of the forward rotation odd-numbered stage rocking pawl members Rao are disengaged from the engaging projections 31 of the first driven speed change gear wheel n1, the frictional resistance to fix the forward rotation odd-numbered stage rocking pawl member Rao disappears, and the forward rotation odd-numbered stage cam rods Cao biased by the coil spring 53s of the lost motion mechanism 53 move rightwardly late, whereupon the pin members 23 received in the cam groove v1 moves out from the cam groove v1. Consequently, the forward rotation odd-numbered stage rocking pawl members Rao are rocked to retract the engaging pawl portion Rp thereof to the inner side.

As described above, upon shift-up from the acceleration state of the first speed to the second speed state in which the reduction ratio is lower by one stage, in a state in which the engaging projections 31 of the first driven speed change gear wheel n1 are abutted with the engaging pawl portions Rp of the forward rotation odd-numbered stage rocking pawl members Rao to rotate the counter gear wheel shaft 12 at a speed equal to that of the first driven speed change gear wheel n1, the engaging projections 31 of the second driven speed change gear wheel n2 which rotates at a higher speed catch up and are abutted with engaging pawl portions Rp of the forward rotation even-numbered stage rocking pawl members Rae thereby to rotate the counter gear wheel shaft 12 at a higher speed together with the second driven speed change gear wheel n2 to carry out speed change. Therefore, the engaging pawl portions Rp of the forward rotation odd-numbered stage rocking pawl members Rao naturally leave the engaging projections 31 of the first driven speed change gear wheel n1, and the engagement is canceled smoothly. Consequently, smooth operation can be carried out to carry out smooth shift-up without requiring force for the disengagement.

Also upon shift-up from the second speed to the third speed, from the third speed to the fourth speed, from the fourth speed to the sixth speed and from the fifth speed to the sixth speed, in a state in which a driven speed change gear wheel n engages with the rocking pawl members R, another driven speed change gear wheel n whose reduction rate is lower by one stage is engaged with the rocking pawl members R to carry out shift-up. Therefore, a smooth operation is carried out without force for the disengagement and without the necessity for a clutch for speed change, and the changeover time upon shift-up involves no loss and no miss of the driving force. Also the speed change shock is small, and smooth shift-up can be carried out.

Also upon shift-down, in a state in which a driven speed change gear wheel n engages with the rocking pawl members R, another driven speed change gear wheel n whose reduction rate is higher by one stage is engaged with the rocking pawl members R to carry out shift-down similarly. Therefore, a smooth operation is carried out without force for the disengagement and without the necessity for a clutch for speed change, and the changeover time upon shift-down involves no loss and no miss of the driving force. Also the speed change shock is small, and smooth shift-down can be carried out.

An attachment structure of the output sprocket wheel 32 which is spline-fitted with the left side cylindrical portion 12b of the counter gear wheel shaft 12 in such a multi-stage speed change gear as described above is described with reference to FIGS. 16 and 17.

Figure 16:
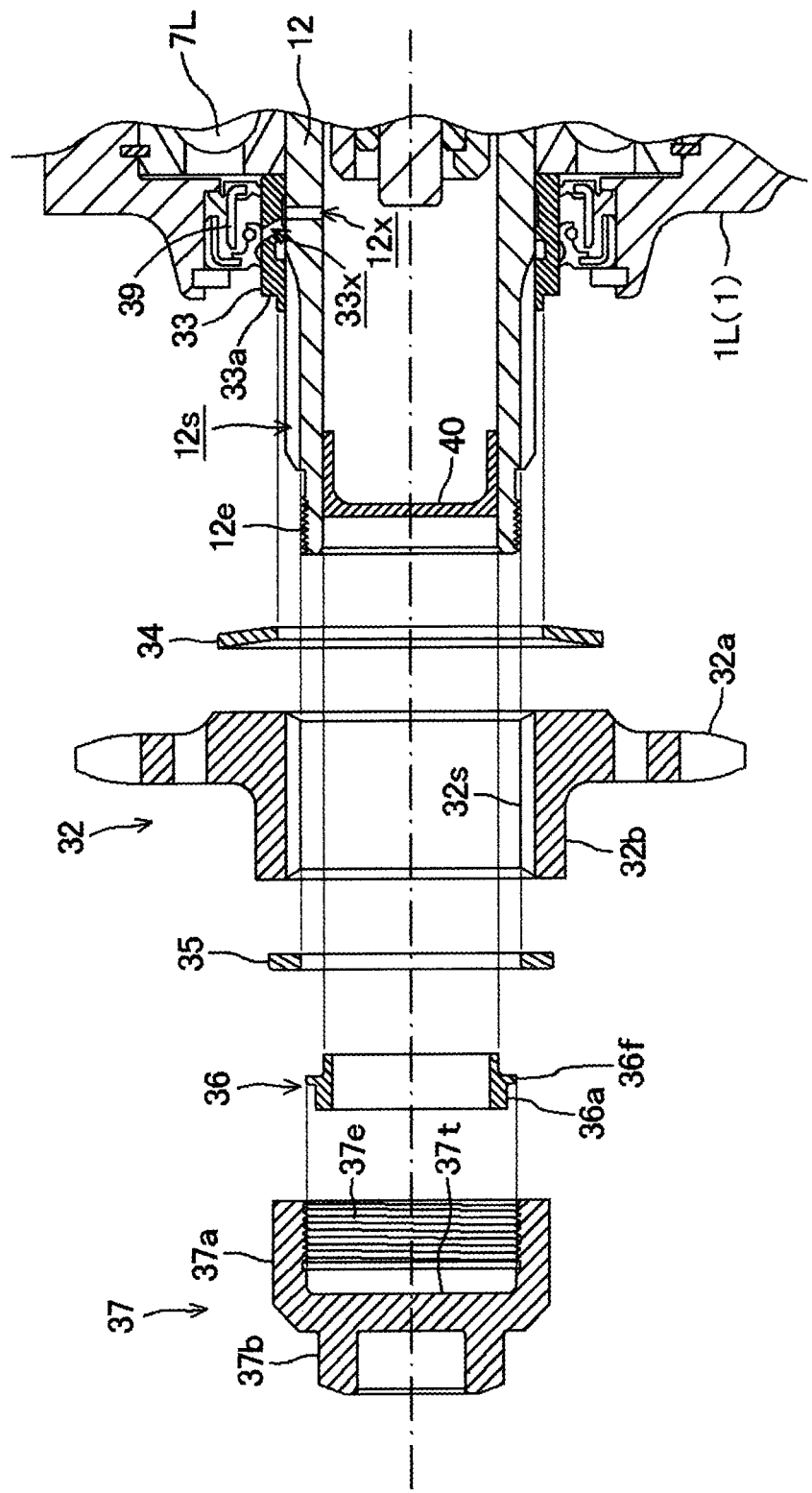
FIG. 16 is an exploded sectional view illustrating an attachment structure of the output sprocket wheel to the counter gear wheel shaft.

Referring to FIG. 16, a cylindrical collar member 33 which fits with the left side cylindrical portion 12b of the counter gear wheel shaft 12 abuts with the inner race of the bearing 7L which supports the counter gear wheel shaft 12 for rotation, and a plurality of supply oil introduction holes 12x penetrated in a diametrical direction at a place of the counter gear wheel shaft 12 at which the collar member 33 is fitted are perforated, and introduction holes 33x are formed in a corresponding relationship also in the collar member 33 and an annular seal member 39 covers an outer periphery of the collar member 33.

A stepped portion 33a of a reduced diameter is formed at the left end of the collar member 33.

It is to be noted that a bottomed cylindrical lid member 40 is fitted in the inside of the left side cylindrical portion 12b of the counter gear wheel shaft 12.

The left side cylindrical portion 12b of the counter gear wheel shaft 12 has spline grooves 12s formed such that they extend outwardly sidewardly from a portion around a left end portion of the collar member 33, and the male threads 12e are formed at an end portion of the counter gear wheel shaft 12 as described hereinabove.

A coned disk spring 34 is fitted in the left side cylindrical portion 12b of the counter gear wheel shaft 12 such that an inner circumferential edge thereof is fitted with the stepped portion 33a of the collar member 33.

Further, the output sprocket wheel 32 is spline-fitted with the spline grooves 12s of the counter gear wheel shaft 12.

In the output sprocket wheel 32, an inner circumferential end of an inner circumferential base portion which supports spline teeth 32a extends to the outer side in an axial direction to configure a cylindrical base portion 32b, and spline projections 32s are formed on an inner circumferential face of the cylindrical base portion 32b.

If the spline projections 32s of the output sprocket wheel 32 are spline-fitted with the spline grooves 12s of the counter gear wheel shaft 12, then the output sprocket wheel 32 presses the coned disk spring 34 fitted with the stepped portion 33a of the collar member 33.

After the output sprocket wheel 32 is fitted, an annular spacer 35 is fitted to a position forwardly of the spline grooves 12s on an axial end of the counter gear wheel shaft 12 until it is abutted with the cylindrical base portion 32b of the output sprocket wheel 32.

The spacer 35 is a metal member in the form of a ring-shaped plate of inner and outer diameters opposing to the left end face of the cylindrical base portion 32b of the output sprocket wheel 32, and is formed by applying DLC (Diamond-Like Carbon) working.

The DLC is a hard carbon film and is very excellent in surface smoothness and abrasion resistance.

Then, a cylindrical interposition member 36 is abutted with an axial end of the counter gear wheel shaft 12 and a cap nut 37 is screwed on the male threads 12e at the axial end of the counter gear wheel shaft 12.

The cap nut 37 has female threads 37e formed on an inner circumferential face of a bottomed cylindrical portion 37a which is a body of the cap nut 37, and a working cylindrical portion 37b projects from the bottom wall of the bottomed cylindrical portion 37a.

The interposition member 36 has a flange 36f formed on an outer circumferential face of a cylindrical portion 36a thereof in an opposing relationship to the axial end of the counter gear wheel shaft 12, and the flange 36f is positioned at a predetermined distance from the left end face of the cylindrical portion 36a.

The interposition member 36 is abutted at the flange 36f thereof with the axial end of the counter gear wheel shaft 12.

Then, if the cap nut 37 is tightened so as to cover the interposition member 36 and is screwed on the male threads 12e of the counter gear wheel shaft 12, then a bottom face 37t of the bottomed cylindrical portion 37a of the cap nut 37 is abutted with the interposition member 36 and fixed at a predetermined position.

At this time, the bottomed cylindrical portion 37a of the cap nut 37 is abutted at the right side opening end face thereof with the spacer 35 which moves together with the output sprocket wheel 32 which is biased leftwardly by the coned disk spring 34.

Figure 17:
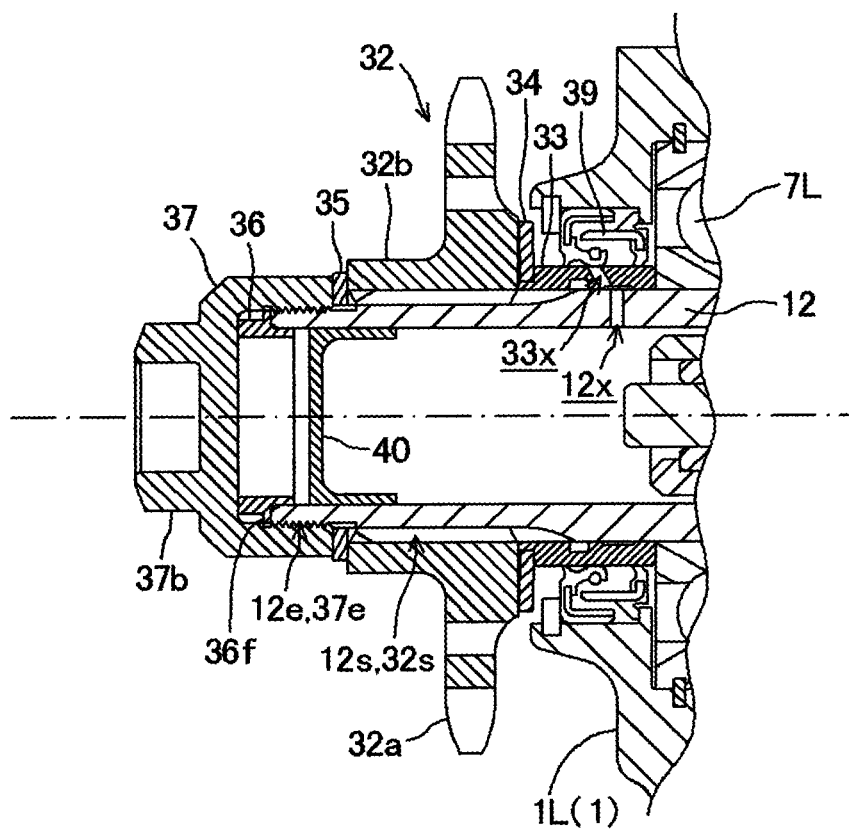
FIG. 17 is a sectional view showing the attachment structure of the output sprocket wheel to the counter gear wheel shaft.

A state in which the assembly of the output sprocket wheel 32 to the counter gear wheel shaft 12 is completed in this manner is illustrated in FIG. 17.

The cap nut 37 is screwed on the male threads 12e of the counter gear wheel shaft 12 and the interposition member 36 is sandwiched and interposed between the bottom face 37t of the cap nut 37 and the axial end of the counter gear wheel shaft 12 and fixed to a predetermined position of the counter gear wheel shaft 12 in the axial direction. Movement of the output sprocket wheel 32 pressed outwardly sidewardly (leftwardly) by the coned disk spring 34 is restricted by the opening end portion of the cap nut 37 through the spacer 35.

In particular, the output sprocket wheel 32 is permitted to move within a required range in the axial direction while it is biased by the coned disk spring 34.

Movement of the output sprocket wheel 32 in the axial direction is permitted without directly tightening and fixing the output sprocket wheel 32 to the counter gear wheel shaft 12, and while a force component which is applied to the output sprocket wheel 32 and is deflected in the axial direction is absorbed by the coned disk spring 34, stabilized power transmission can be carried out with the output sprocket wheel 32 always positioned in a required axial range.

Figure 18:
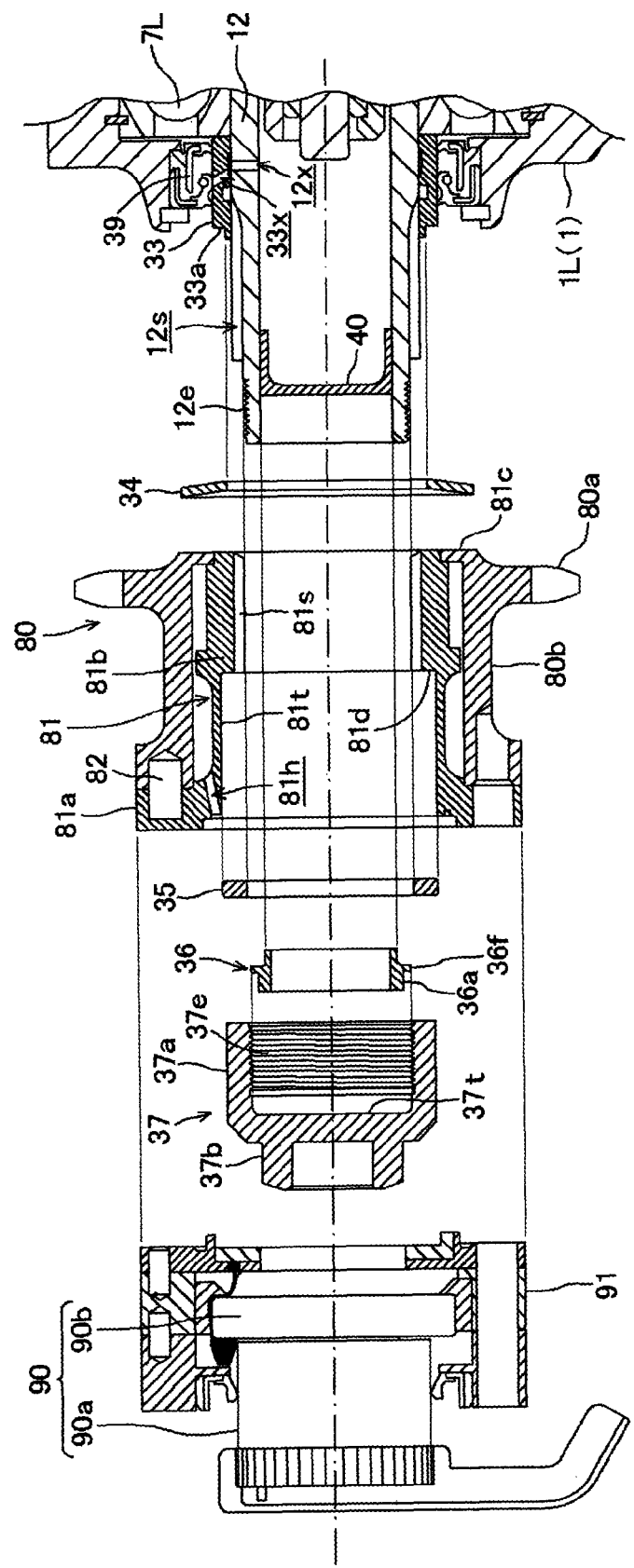
FIG. 18 is an exploded sectional view illustrating an attachment structure of an output sprocket wheel to a counter gear wheel shaft according to another embodiment.
Figure 19:
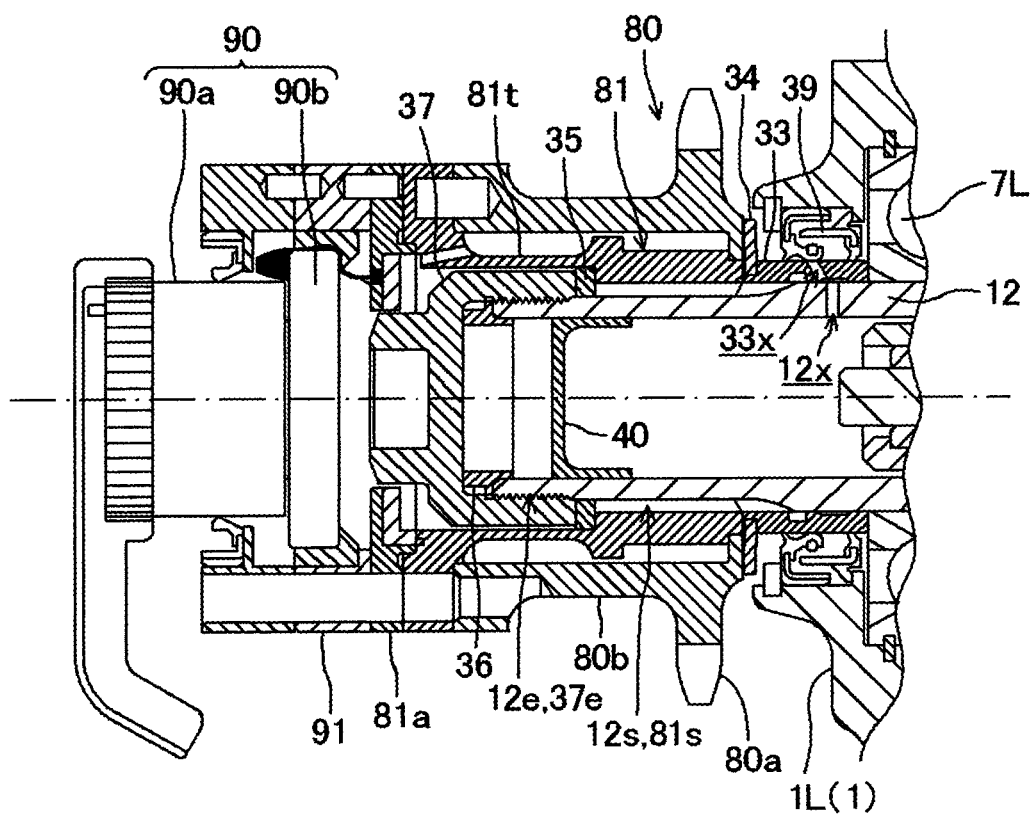
FIG. 19 is a sectional view showing the attachment structure of the output sprocket wheel to the counter gear wheel shaft.

Now, an attachment structure for an output sprocket wheel according to another embodiment is described with reference to FIGS. 18 and 19.

If the present attachment structure for an output sprocket wheel 80 is compared with the attachment structure for the output sprocket wheel 32 according to the embodiment described above, it is substantially the same except the output sprocket wheel 80, and like members are denoted by like reference symbols.

The output sprocket wheel 80 is not fitted directly with the spline grooves 12s of the counter gear wheel shaft 12, but a torque detecting cylindrical member 81 which supports the output sprocket wheel 80 from the inner side is spline-fitted.

In the output sprocket wheel 80, an inner circumferential end of an inner circumferential base portion which supports sprocket teeth 80a extends comparatively long to the outer side in an axial direction to configure a cylindrical base portion 80b.

The torque detecting cylindrical member 81 is fitted at a cylindrical portion 81b thereof with the inner side of the cylindrical base portion 80b of the output sprocket wheel 80 and is abutted at a flange 81a thereof, which is formed at an outer side end (left end) of the cylindrical portion 81b thereof, from the left side with the outer side end of the cylindrical base portion 80b of the output sprocket wheel 80, and the outer side end of the cylindrical base portion 80b and the outer side end of the flange 81a are fixed by a knock pin 82 and a bolt (not shown).

It is to be noted that, at the right end of the cylindrical base portion 80b of the output sprocket wheel 80, an inner flange 81c which projects toward the center axis on the inner side is engaged with a cutout on a right end outer circumferential edge of the cylindrical portion 81b of the torque detecting cylindrical member 81.

Spline ribs 81s which fit with the spline grooves 12s of the counter gear wheel shaft 12 are formed at a right side portion of an inner circumferential face of the cylindrical portion 81b of the torque detecting cylindrical member 81, and a left side portion of the cylindrical portion 81b with respect to the spline ribs 81s has an outer circumferential face having a reduced outer diameter while an inner diameter of an inner circumferential face is expanded to configure a stepped portion 81d such that a thin torsion detecting cylindrical portion 81t of a constricted shape is formed.

It is to be noted that through-holes 81h are perforated around a root of the flange 81a of the torque detecting cylindrical member 81.

A magnetic sheet or the like which is a detection section of a torque sensor is pasted to an outer circumferential face of the torsion detecting cylindrical portion 81t, and a signal line for the same can be led to the outside through the through-holes 81h.

The torque detecting cylindrical member 81 and the output sprocket wheel 80 which are fitted inwardly and outwardly in this manner are integrally spline-fitted with the left side cylindrical portion 12b of the counter gear wheel shaft 12 with which the coned disk spring 34 is fitted.

In particular, the right side spline ribs 81s of the cylindrical portion 81b of the torque detecting cylindrical member 81 are spline-fitted in the spline grooves 12s of the counter gear wheel shaft 12 and the output sprocket wheel 80 presses the coned disk spring 34.

Thereafter, if the spacer 35 is fitted to the axial end of the counter gear wheel shaft 12, then the spacer 35 is inserted into the inside of the left side torsion detecting cylindrical portion 81t of the cylindrical portion 81b of the torque detecting cylindrical member 81 until it is abutted with the stepped portion 81d of the cylindrical portion 81b.

Then, the interposition member 36 is interposed on the inner side and the cap nut 37 is screwed with the male threads 12e at the axial end of the counter gear wheel shaft 12.

The bottomed cylindrical portion 37a of the cap nut 37 is inserted into the inside of the torsion detecting cylindrical portion 81t of the torque detecting cylindrical member 81.

After the output sprocket wheel 80 is attached to the counter gear wheel shaft 12 through the torque detecting cylindrical member 81 in this manner, the cap nut 37 is fixed at a predetermined position of the counter gear wheel shaft 12 in the axial direction through the interposition member 36. Consequently, movement of the output sprocket wheel 80 pressed outwardly sidewardly (leftwardly) by the coned disk spring 34 is restricted by the opening end portion of the cap nut 37 through the spacer 35 which is abutted with the stepped portion 81d of the torque detecting cylindrical member 81.

The output sprocket wheel 80 is tightened directly without being fixed to the counter gear wheel shaft 12 to permit movement in the axial direction, and while a force component which is applied to the output sprocket wheel 80 and is deflected in the axial direction is absorbed by the coned disk spring 34, stabilized power transmission can be carried out with the output sprocket wheel 80 always positioned in a required axial range.

A torque sensor 90 is configured such that a rotational disk portion 90b is assembled coaxially to a cylindrical body 90a, and the rotational disk portion 90b cooperates with the cylindrical body 90a to configure a slip ling.

The disk portion 90b of such a torque sensor 90 as described above is held by a cylindrical torque sensor holding member 91, and the torque sensor holding member 91 is fastened to the flange 81a of the torque detecting cylindrical member 81 by a bolt (not shown).

It is to be noted that this bolt fastens the torque sensor holding member 91, the flange 81a of the torque detecting cylindrical member 81 and the left end of the cylindrical base portion 80b of the output sprocket wheel 80 integrally to each other.

Accordingly, the torque detecting cylindrical member 81, torque sensor holding member 91 and rotational disk portion 90b of the torque sensor 90 rotate together with the output sprocket wheel 80.

A signal line extending from a torque sensor detection section provided on the torsion detecting cylindrical portion 81t can pass through the through-holes 81h and be connected to the rotational disk portion 90b, and a detection signal can be inputted to and processed by the cylindrical body 90a of the torque sensor 90.

Since rotating force of the counter gear wheel shaft 12 is transmitted from the spline fitting portion of the torque detecting cylindrical member 81 to the flange 81a as the end portion of the torsion detecting cylindrical portion 81t through the torsion detecting cylindrical portion 81t and then from the flange 81a to the output sprocket wheel 80, by detecting a twisted state of the torsion detecting cylindrical portion 81t by means of the torque sensor detection section, driving torque can be detected easily.

What is claimed is:

1. An attachment structure for an output sprocket wheel for transmitting driving of an output power shaft of an internal combustion engine to a chain, comprising:
   a coned disk spring fitted with the output power shaft is abutted with and positioned by a stepped portion;
   the output sprocket wheel spline-fitted with spline grooves formed at an outer side portion of the output power shaft with respect to the stepped portion is pressed by said coned disk spring;
   a cap nut which engages with male threads formed at an end portion of the output power shaft is restricted and fixed at a bottom face thereof by and to an axial end of the output power shaft; and
   movement in an axial direction of the output sprocket wheel pressed by the coned disk spring is restricted by an opening end portion of the cap nut.

2. The attachment structure for the output sprocket wheel according to claim 1, wherein an annular spacer is inserted between the opening end portion of said cap nut and the output sprocket wheel.

3. The attachment structure for the output sprocket wheel according to claim 2, wherein said spacer includes a diamond-like carbon film.

4. The attachment structure for the output sprocket wheel according to claim 3, wherein an interposition member is interposed between the axial end of the output power shaft and a bottom face of said cap nut.

5. The attachment structure for the output sprocket wheel according to claim 4, wherein:
   a plurality of driving speed change gear wheels and a plurality of driven speed change gear wheels are supported for rotation on gear wheel shafts, which extend in parallel to each other, in a normally meshing state for individual shift stages;
   the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
   the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

6. The attachment structure for the output sprocket wheel according to claim 3, wherein:
   a plurality of driving speed change gear wheels and a plurality of driven speed change gear wheels are supported for rotation on gear wheel shafts, which extend in parallel to each other, in a normally meshing state for individual shift stages;
   the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
   the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

7. The attachment structure for the output sprocket wheel according to claim 2, wherein an interposition member is interposed between the axial end of the output power shaft and a bottom face of said cap nut.

8. The attachment structure for the output sprocket wheel according to claim 7, wherein:
   a plurality of driving speed change gear wheels and a plurality of driven speed change gear wheels are supported for rotation on gear wheel shafts, which extend in parallel to each other, in a normally meshing state for individual shift stages;
   the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
   the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

9. The attachment structure for the output sprocket wheel according to claim 2, wherein:
   a plurality of driving speed change gear wheels and a plurality of driven speed change gear wheels are supported for rotation on gear wheel shafts, which extend in parallel to each other, in a normally meshing state for individual shift stages;
   the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
   the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

10. The attachment structure for the output sprocket wheel according to claim 1, wherein an interposition member is interposed between the axial end of the output power shaft and a bottom face of said cap nut.

11. The attachment structure for the output sprocket wheel according to claim 10, wherein:
- a plurality of driving speed change gear wheels and a plurality of driven speed change gear wheels are supported for rotation on gear wheel shafts, which extend in parallel to each other, in a normally meshing state for individual shift stages;
- the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
- the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

12. The attachment structure for the output sprocket wheel according to claim 1, wherein:
- a plurality of driving speed change gear wheels and a plurality of driven speed change gear wheels are supported for rotation on gear wheel shafts, which extend in parallel to each other, in a normally meshing state for individual shift stages;
- the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
- the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

13. An attachment structure for an output sprocket wheel for transmitting driving of an output power shaft of an internal combustion engine to a chain, comprising:
- a coned disk spring fitted with the output power shaft is abutted with and positioned by a stepped portion;
- a torque detecting cylindrical member is spline-fitted with spline grooves formed at an axial outer side portion of the output power shaft with respect to said stepped portion;
- the output sprocket wheel extends, at an inner circumferential end of an inner circumferential base portion thereof which supports sprocket teeth, to the outer side in an axial direction to configure a cylindrical base portion;
- the cylindrical base portion of the output sprocket wheel covers an outer circumference of the torque detecting cylindrical member;
- an axial outer side end portion of the cylindrical base portion is fixed to an end portion of a torsion detecting cylindrical portion which extends to the outer side in the axial direction from a spline fitting portion of the torque detecting cylindrical member;
- an axial inner side end portion of the cylindrical base portion is pressed by the coned disk spring;
- a cap nut which engages with male threads formed at an end portion of the output power shaft is restricted and fixed at a bottom face thereof by and to an axial end of the output power shaft; and
- movement in the axial direction of the output sprocket wheel pressed by the coned disk spring is restricted by an opening end portion of the cap nut.

14. The attachment structure for the output sprocket wheel according to claim 13, wherein:
- a plurality of driving speed change gear wheels and a plurality of driven speed change gear wheels are supported for rotation on gear wheel shafts, which extend in parallel to each other, in a normally meshing state for individual shift stages;
- the plural driving speed change gear wheels from among the driving speed change gear wheels and the driven speed change gear wheels are fixed to the gear wheel shaft while an engagement changing mechanism for changing over the engagement between the gear wheel shaft and one of the driven speed change gear wheels for the individual gear wheels between the other plural driven speed change gear wheels and the gear wheel shaft is provided; and
- the gear wheel shaft for the driven speed change gear wheels of a multistage speed change gear wherein a control rod of a speed change driving mechanism moves in an axial direction in the inside of the gear wheel shaft to drive the engagement changing mechanism to carry out speed change is the output power shaft.

* * * * *